(12) United States Patent
Castrechini et al.

(10) Patent No.: US 10,275,750 B2
(45) Date of Patent: Apr. 30, 2019

(54) PAYMENT PROCESSING AND CUSTOMER ENGAGEMENT PLATFORM METHODS, APPARATUSES AND MEDIA

(71) Applicant: Cayan LLC, Boston, MA (US)

(72) Inventors: Marc Castrechini, Boston, MA (US); Henry Helgeson, Boston, MA (US); Markiyan Malko, Boston, MA (US)

(73) Assignee: CAYAN LLC, Boston, MA (US)

( * ) Notice: Subject to any disclaimer, the term of this patent is extended or adjusted under 35 U.S.C. 154(b) by 1038 days.

(21) Appl. No.: 14/363,765

(22) PCT Filed: Dec. 10, 2012

(86) PCT No.: PCT/US2012/068728
§ 371 (c)(1),
(2) Date: Jun. 6, 2014

(87) PCT Pub. No.: WO2013/086487
PCT Pub. Date: Jun. 13, 2013

(65) Prior Publication Data
US 2014/0351147 A1    Nov. 27, 2014

Related U.S. Application Data

(60) Provisional application No. 61/717,794, filed on Oct. 24, 2012, provisional application No. 61/568,864, filed on Dec. 9, 2011.

(51) Int. Cl.
*G06Q 20/20*    (2012.01)
*G06Q 30/06*    (2012.01)
(Continued)

(52) U.S. Cl.
CPC ......... *G06Q 20/20* (2013.01); *G06Q 20/027* (2013.01); *G06Q 20/204* (2013.01);
(Continued)

(58) Field of Classification Search
CPC ..................................................... G06Q 20/20
See application file for complete search history.

(56) References Cited

U.S. PATENT DOCUMENTS 8,380,177 B2 *  2/2013  Laracey ............. G06Q 30/0253
370/259
8,805,725 B2 *  8/2014  Calman ................. G06Q 30/06
705/16

(Continued)

OTHER PUBLICATIONS

Urien et al., "A Breakthrough for Prepaid Payment: End to End Token Exchange and Management Using Secure SSL Channels Created by EAP-TLS Smart Cards," IEEE, all pages. (Year: 2011).*

*Primary Examiner* — Jacob C. Coppola
(74) *Attorney, Agent, or Firm* — Brownstein, Hyatt, Farber, Schreck, LLP

(57) ABSTRACT

A customer engagement device (CED) may receive a payment token associated with a transaction from a point of sale (POS) system. The CED may retrieve transaction details associated with the transaction from a gateway. The CED may prompt a customer to provide payment information for the transaction and may collect payment information from the customer. The CED may provide the payment information and may obtain a transaction authorization from the gateway. The CED may inform the POS system regarding the transaction authorization.

11 Claims, 12 Drawing Sheets

(51) Int. Cl.
    *G06Q 20/32* (2012.01)
    *G06Q 20/42* (2012.01)
    *G06Q 40/02* (2012.01)
    *G06Q 20/02* (2012.01)
    *G06Q 20/22* (2012.01)
    *G06Q 20/38* (2012.01)
    *G06Q 20/40* (2012.01)
    *G06Q 30/02* (2012.01)

(52) U.S. Cl.
    CPC ......... *G06Q 20/227* (2013.01); *G06Q 20/322* (2013.01); *G06Q 20/382* (2013.01); *G06Q 20/40* (2013.01); *G06Q 20/42* (2013.01); *G06Q 30/0268* (2013.01); *G06Q 30/06* (2013.01); *G06Q 40/02* (2013.01)

(56) References Cited

U.S. PATENT DOCUMENTS

2008/0133351 A1*  6/2008  White ................ G06Q 20/387
                                                705/14.27
2012/0296726 A1* 11/2012  Dessert ............. G06Q 30/0238
                                                705/14.27

* cited by examiner

US 10,275,750 B2

PAYMENT PROCESSING AND CUSTOMER ENGAGEMENT PLATFORM METHODS, APPARATUSES AND MEDIA

CROSS-REFERENCE TO RELATED APPLICATIONS

Applicant hereby claims priority under 35 U.S.C. § 119 to U.S. provisional patent application No. 61/568,864, filed Dec. 9, 2011, entitled "SYSTEM AND METHOD FOR SECURED PAYMENT COLLECTION AND TRANSACTION PROCESSING" ; and to U.S. provisional patent application No. 61/717,794, filed Oct. 24, 2012, entitled "PAYMENT PROCESSING AND CUSTOMER ENGAGEMENT PLATFORM METHODS, APPARATUSES AND MEDIA" .

This disclosure describes PAYMENT PROCESSING AND CUSTOMER ENGAGEMENT PLATFORM METHODS, APPARATUSES AND MEDIA (hereinafter "PPCEP"). A portion of the disclosure of this patent document contains material which is subject to copyright and/or mask work protection. The copyright and/or mask work owners have no objection to the facsimile reproduction by anyone of the patent document or the patent disclosure, as it appears in the Patent and Trademark Office patent file or records, but otherwise reserve all copyright and mask work rights whatsoever.

The entire contents of the aforementioned applications are herein expressly incorporated by reference in their entirety.

FIELD

The present disclosure is directed generally to payment processing and customer engagement platforms.

BACKGROUND

Credit cards, debit cards, and other electronic payment methods that do not involve physical currency are popular with both customers and merchants. In a typical transaction, a merchant may swipe a customer's credit card to provide the merchant's point of sale (POS) system with payment details. The merchant's POS may then transmit these payment details to a payment processor and request the payment processor to authorize the transaction.

SUMMARY

The Advantages of the present disclosure will be set forth in and become apparent from the description that follows. Additional advantages of the disclosure will be realized and attained by the methods and systems particularly pointed out in the written description and claims hereof, as well as from the appended drawings.

To achieve these and other advantages and in accordance with the purpose of the disclosure, as embodied herein, in one embodiment, the disclosure provides a processor-implemented payment collection method, that includes receiving by a customer engagement device via a processor a payment token associated with a transaction from a point of sale system, retrieving via the processor transaction details associated with the transaction from a gateway, prompting via the processor a customer to provide payment information for the transaction, collecting via the processor payment information from the customer, providing via the processor the payment information to the gateway, obtaining via the processor a transaction authorization from the gateway based on the provided payment information, and informing via the processor the point of sale system regarding the transaction authorization.

In accordance with a further aspect, the retrieved transaction details can include at least one of a customer identifier, an item identifier, item quantity, item price and a total amount due. The payment information can include at least one of a credit card number, a debit card number, a mobile wallet account number, a coupon, a code, a rewards account number, and a loyalty program account number. The payment information may be collected via at least one of a card reader, a scanner, a contactless chip reader, a keyboard and a touchscreen. Collecting payment information can further include determining available payment methods for the transaction, determining a preference order for the available payment methods, and displaying the available payment methods in accordance with the preference order.

In accordance with still further aspects, the available payment methods are preferably payment methods supported by the customer engagement device. the available payment methods can be determined based on characteristics of the transaction. The characteristics of the transaction can include at least one of item type, item price, item quantity and a total amount due. The preference order can be determined based on transaction costs associated with the available payment methods. The preference order can be determined by the processor based on branding associated with the available payment methods. The preference order can be determined based on tracking or reporting capabilities associated with the available payment methods. Displaying the available payment methods can include, for example, arranging the available payment methods from most preferable to least preferable. If desired, displaying the available payment methods can include selecting the most preferable payment method for the customer by default.

In accordance with further aspects, the method can further include obtaining a payment method selection from the customer, determining that a more preferable payment method is available, providing a payment steering message to the customer, obtaining an updated payment method selection from the customer, and obtaining payment details associated with the updated payment method selection. The payment steering message can include an informational message. The payment steering message can include an incentive for using the more preferable payment method. For example, the incentive can include a discount offer, a cash back offer, a coupon and/or loyalty points. If desired, the method can further include determining that reward points are associated with the customer's payment method. If desired, the method can further include facilitating the use of the reward points to pay for at least a portion of the transaction. If desired, the method can include obtaining promotional material appropriate for the customer engagement device, providing the promotional material to the customer.

In accordance with further embodiments, the disclosure provides a payment collection apparatus, including a memory, a processor in communication with the memory, and configured to issue a plurality of processing instructions stored in the memory, wherein the processor is adapted and configured to issue instructions to receive by a customer engagement device a payment token associated with a transaction from a point of sale system, retrieve transaction details associated with the transaction from a gateway, prompt a customer to provide payment information for the transaction, collect payment information from the customer, provide the payment information to the gateway, obtain a transaction authorization from the gateway based on the provided payment information, and inform the point of sale system regarding the transaction authorization.

In accordance with further aspects, the retrieved transaction details can include at least one of a customer identifier, an item identifier, an item quantity, an item price and a total amount due. The payment information can include one or more of a credit card number, a debit card number, a mobile wallet account number, a coupon, a code, a rewards account number, and a loyalty program account number. The apparatus can include one or more of a card reader, a scanner, a contactless chip reader, a keyboard and a touchscreen for collecting payment information. The processor can be adapted and configured to issue instructions to determine available payment methods for the transaction, determine a preference order for the available payment methods, and display the available payment methods in accordance with the preference order. The available payment methods are preferably payment methods supported by the customer engagement device. The processor can be adapted and configured to issue instructions to determine available payment methods based on characteristics of the transaction.

In accordance with further aspects, the characteristics of the transaction can include one or more of item type, item price, item quantity and a total amount due. The preference order can be determined by the processor based on transaction costs associated with the available payment methods. The preference order can be determined by the processor based on branding associated with the available payment methods. The preference order can be determined by the processor based on tracking or reporting capabilities associated with the available payment methods. The processor can be adapted and configured to issue instructions to display the available payment methods by arranging the available payment methods from most preferable to least preferable. The processor can be adapted and configured to issue instructions to display the available payment methods by selecting the most preferable payment method for the customer by default.

In accordance with further aspects, the processor of the payment collection apparatus can be adapted and configured to issue instructions to obtain a payment method selection from the customer, determine that a more preferable payment method is available, direct a payment steering message to the customer, obtain an updated payment method selection from the customer, and obtain payment details associated with the updated payment method selection. The payment steering message can include an informational message. The payment steering message can include an incentive for using the more preferable payment method. For example, the incentive can include one or more of (i) a discount offer, (ii) a cash back offer, (iii) a coupon, and (iv) loyalty points.

In accordance with still further aspects, the processor of the payment collection apparatus can be further adapted and configured to issue instructions to determine that reward points are associated with the customer's payment method, and facilitate the use of the reward points to pay for at least a portion of the transaction. The processor can be adapted and configured to issue instructions to obtain promotional material appropriate for the customer engagement device. The processor can be adapted and configured to issue instructions to provide the promotional material to the customer.

In further accordance with the disclosure, a payment collection processor-readable physical medium storing processor-issuable instructions is provided, the instructions being adapted to receive by a customer engagement device a payment token associated with a transaction from a point of sale system, retrieve transaction details associated with the transaction from a gateway, prompt a customer to provide payment information for the transaction, collect payment information from the customer, provide the payment information to the gateway, obtain a transaction authorization from the gateway based on the provided payment information, and inform the point of sale system regarding the transaction authorization.

In some implementations, the retrieved transaction details can include one or more of a customer identifier, an item identifier, an item quantity, an item price, and a total amount due. The payment information can include one or more of a credit card number, a debit card number, a mobile wallet account number, a coupon, a code, a rewards account number, and a loyalty program account number. The payment information may be collected via one or more of a card reader, a scanner, a contactless chip reader, a keyboard, and a touchscreen.

In accordance with further implementations, the processor issuable instructions for collecting payment information can further include instructions to determine available payment methods for the transaction, determine a preference order for the available payment methods, and display the available payment methods in accordance with the preference order. The available payment methods are preferably payment methods supported by the customer engagement device. The instructions can be adapted to determine via processor available payment methods based on characteristics of the transaction. The characteristics of the transaction can include at least one of item type, item price, item quantity, and a total amount due. The preference order can be determined via processor based on transaction costs associated with the available payment methods. The instructions can be adapted to determine preference order via processor based on branding associated with the available payment methods. The instructions can be adapted to determine preference order via processor based on tracking or reporting capabilities associated with the available payment methods. The instructions for displaying the available payment methods can include instructions for arranging the available payment methods from most preferable to least preferable. The instructions for displaying the available payment methods can include instructions for selecting the most preferable payment method for the customer by default.

In accordance with further implementations, the payment collection processor-readable physical medium can further include instructions for obtaining a payment method selection from the customer, instructions for determining that a more preferable payment method is available, instructions for providing a payment steering message to the customer, instructions for obtaining an updated payment method selection from the customer, and instructions for obtaining payment details associated with the updated payment method selection.

In accordance with further implementations, the payment steering message can include an informational message. The payment steering message can include an incentive for using the more preferable payment method. The incentive can be one or more of a discount offer, a cash back offer, a coupon, loyalty points. The processor-readable physical medium can further include instructions for determining that reward points are associated with the customer's payment method, and instructions for facilitating the use of the reward points to pay for at least a portion of the transaction. The payment collection processor-readable physical medium can further include instructions for obtaining promotional material appropriate for the customer engagement device and/or instructions for providing the promotional material to the customer.

The disclosure further provides a processor-implemented payment collection method. The method includes receiving at a gateway via a processor transaction details associated with a transaction from a point of sale system, storing via the processor the received transaction details, generating via the processor a payment token associated with the stored transaction details, sending via the processor the payment token to the point of sale system, obtaining via the processor a transaction details request including the payment token from a customer engagement device, providing via the processor the stored transaction details associated with the payment token to the customer engagement device, and authorizing via the processor payment information, provided by the customer engagement device for the transaction.

In some further aspects, the received transaction details can include one or more of a customer identifier, an item identifier, an item quantity, an item price, and a total amount due. The method can further include merging the received transaction details with stored historical transactions details via processor. In some embodiments, the point of sale system can be aware of the gateway and the generated payment token is in a desired format. In some embodiments, the point of sale system is not aware of the gateway and the generated payment token is in a format that simulates payment information expected by the point of sale system from a payment collection peripheral device. The generated payment token can be, for example, a onetime use token, or a time expiring token. The received transaction details request can include one or more of an identifier of the customer engagement device, a location of the customer engagement device, a department identifier of the customer engagement device, and a merchant identifier of the customer engagement device.

If desired, the method can further include determining via processor promotional material appropriate for the transaction, and providing the promotional material to the customer engagement device. The promotional material can include one or more of a coupon, an advertisement, and a discount offer. Determining promotional material appropriate for the transaction can further include determining via processor a promotional profile for the customer engagement device, analyzing via processor promotional material appropriate for the promotional profile with respect to the transaction details, and selecting via processor the best matching promotional material as determined by the analysis. The promotional profile can be determined via processor based on location data associated with the customer engagement device and the stored historical transactions details. The best matching promotional material can be promotional material with a highest likely popularity score. The method can further include analyzing via processor the stored historical transactions details to determine an average sale price for an item. The method can further include analyzing via processor the stored historical transactions details to recommend an alternative item. Moreover, the method can further include analyzing via processor the stored historical transactions details to recommend a complimentary item. If desired, the method can further include analyzing via processor the stored historical transactions details to determine an effective advertising location for a manufacturer.

In accordance with yet further aspects, authorizing payment information can further include determining via processor that additional data is desired, and obtaining via processor the additional data from the customer engagement device. The additional data can be one or more of a signature, a PIN, and a zip code. The authorizing payment information can further include determining via processor that an additional payment method is desired, and obtaining via processor payment information for the additional payment method from the customer engagement device.

The disclosure further provides a payment collection apparatus, including a memory, a processor in communication with the memory, and configured to issue a plurality of processing instructions stored in the memory, wherein the processor is adapted and configured to issue instructions to receive at a gateway transaction details associated with a transaction from a point of sale system, store the received transaction details, generate a payment token associated with the stored transaction details, send the payment token to the point of sale system, obtain a transaction details request including the payment token from a customer engagement device, provide the stored transaction details associated with the payment token to the customer engagement device, and authorize payment information, provided by the customer engagement device, for the transaction.

In accordance with further aspects, the received transaction details can include one or more of a customer identifier, an item identifier, an item quantity, an item price, and a total amount due. The processor can be further adapted and configured to issue instructions to merge the received transaction details with stored historical transactions details. The point of sale system can be aware of the gateway and the generated payment token can be in a desired format. In some implementations, the point of sale system can be unaware of the gateway and the generated payment token can be in a format that simulates payment information expected by the point of sale system from a payment collection peripheral device. The generated payment token can be, for example, a onetime use token or a time expiring token. The received transaction details request can include one or more of an identifier of the customer engagement device, a location of the customer engagement device, a department identifier of the customer engagement device and a merchant identifier of the customer engagement device.

In accordance with further aspects, the processor of the payment collection apparatus can be further adapted and configured to issue instructions to determine promotional material appropriate for the transaction, and provide the promotional material to the customer engagement device. The promotional material can include one or more of a coupon, an advertisement, and a discount offer. The processor can be further adapted and configured to issue instructions for determining promotional material appropriate for the transaction, including instructions for determining a promotional profile for the customer engagement device, instructions for analyzing promotional material appropriate for the promotional profile with respect to the transaction details, and instructions for selecting the best matching promotional material as determined by the analysis.

The promotional profile can be determined based on location data associated with the customer engagement device and the stored historical transactions details. The best matching promotional material can be promotional material with the highest likely popularity score. The processor can be further adapted and configured to issue instructions to analyze the stored historical transactions details to determine an average sale price for an item. The processor can be further adapted and configured to issue instructions to analyze the stored historical transactions details to recommend an alternative item. The processor can be further adapted and configured to issue instructions to analyze the stored historical transactions details to recommend a complimentary item. The processor can be further adapted and configured to issue instructions to analyze the stored historical transactions details to determine an effective advertising location for a manufacturer.

In accordance with additional aspects, the processor of the payment collection apparatus can be further adapted and configured to issue instructions for authorizing payment information, including instructions for determining that additional data is desired, and instructions for obtaining the additional data from the customer engagement device. The additional data can be one of a signature, a PIN, and a zip code. The processor can be further adapted and configured to issue instructions for authorizing payment information, including instructions for determining that an additional payment method is desired, and instructions for obtaining payment information for the additional payment method from the customer engagement device.

The disclosure further provides a payment collection processor-readable physical medium storing processor-issuable instructions to receive at a gateway transaction details associated with a transaction from a point of sale system, store the received transaction details, generate a payment token associated with the stored transaction details, send the payment token to the point of sale system, obtain a transaction details request including the payment token from a customer engagement device, provide the stored transaction details associated with the payment token to the customer engagement device, and authorize payment information, provided by the customer engagement device, for the transaction.

In accordance with some further aspects, the received transaction details can include at least one of a customer identifier, an item identifier, an item quantity, an item price, and a total amount due. The payment collection processor-readable physical medium can further include instructions for merging the received transaction details with stored historical transactions details. In some embodiments, the point of sale system can be aware of the gateway and the generated payment token is in a desired format. If desired, the point of sale system may not be aware of the gateway and the generated payment token can be in a format that simulates payment information expected by the point of sale system from a payment collection peripheral device. For example, the generated payment token can be a onetime use token, or a time expiring token.

In accordance with further aspects the received transaction details request can include one or more of an identifier of the customer engagement device, a location of the customer engagement device, a department identifier of the customer engagement device, and a merchant identifier of the customer engagement device.

The payment collection processor-readable physical medium can further include instructions for determining promotional material appropriate for the transaction, and instructions for providing the promotional material to the customer engagement device. The promotional material can include one or more of a coupon, an advertisement and a discount offer. The instructions for determining promotional material appropriate for the transaction can further include instructions for determining a promotional profile for the customer engagement device, instructions for analyzing promotional material appropriate for the promotional profile with respect to the transaction details, and instructions for selecting the best matching promotional material as determined by the analysis. The promotional profile can be determined based on location data associated with the customer engagement device and the stored historical transactions details. The best matching promotional material can be promotional material with the highest likely popularity score. If desired, the payment collection processor-readable physical medium can further include instructions for analyzing the stored historical transactions details to determine an average sale price for an item, instructions for analyzing the stored historical transactions details to recommend an alternative item, instructions for analyzing the stored historical transactions details to recommend a complimentary item, and/or instructions for analyzing the stored historical transactions details to determine an effective advertising location for a manufacturer.

In some embodiments, the instructions for authorizing payment information can further include instructions for determining that additional data is desired, and instructions for obtaining the additional data from the customer engagement device. The additional data can include one or more of a signature, a PIN (Personal Identification Number), and a zip code. If desired, the instructions for authorizing payment information can further include instructions for determining that an additional payment method is desired, and instructions for obtaining payment information for the additional payment method from the customer engagement device.

The disclosure further provides a processor-implemented app ("application" or program) support adding method, including receiving via a processor a request to add an app to a customer engagement device at a scheduled update time, adding via the processor the app to a list of scheduled downloads, informing via the processor the customer engagement device regarding a scheduled download of the app via a periodic heartbeat message, and facilitating via the processor downloading of the app by the customer engagement device at the scheduled update time. If desired, the scheduled update time can be specified, for example, by a merchant associated with the customer engagement device. For each scheduled download, the list of scheduled downloads can include data that in turn includes at least one of app parameters, download settings, the scheduled update time. The app can thus facilitate acceptance of a new payment method by the customer engagement device. The app can facilitate the use of a new feature by the customer engagement device.

The disclosure further provides an app support adding apparatus, including a memory, a processor in communication with the memory, the processor being adapted and configured to issue a plurality of processing instructions stored in the memory, wherein the instructions include instructions for receiving a request to add an app to a customer engagement device at a scheduled update time, instructions for adding the app to a list of scheduled downloads, instructions for informing the customer engagement device regarding a scheduled download of the app via a periodic heartbeat message, and instructions for facilitating downloading of the app by the customer engagement device at the scheduled update time.

In further implementations, the scheduled update time can be specified by, for example, a merchant associated with the customer engagement device. For each scheduled download, or one or more of the scheduled downloads, the list of scheduled downloads can include data including at least one of app parameters, download settings, and the scheduled update time. The app can facilitate acceptance of a new payment method by the customer engagement device. The app can facilitate the use of a new feature by the customer engagement device.

The disclosure further provides an app support adding processor-readable physical medium storing processor-issuable instructions to receive a request to add an app to a customer engagement device at a scheduled update time, add the app to a list of scheduled downloads, inform the customer engagement device regarding a scheduled download of the app via a periodic heartbeat message, and facilitate downloading of the app by the customer engagement device at the scheduled update time.

In accordance with some embodiments, the scheduled update time can be specified by a merchant associated with the customer engagement device. For each scheduled download the list of scheduled downloads can include data including at least one of app parameters, download settings, and the scheduled update time. The app can facilitate acceptance of a new payment method by the customer engagement device, and/or the use of a new feature by the customer engagement device.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

BRIEF DESCRIPTION OF THE FIGURES

The accompanying figures and/or appendices illustrate various exemplary embodiments in accordance with the present disclosure.

DETAILED DESCRIPTION INTRODUCTION

The PPCEP facilitates payment collection by a merchant while avoiding having to have the merchant's POS systems handle payment information. This may result in improved security as the POS system, the merchant's servers, and the merchant's cashiers do not have access to a customer's payment information. Furthermore, by using the PPCEP the merchant gains the ability to accept new payment methods (e.g., mobile wallets, loyalty and/or rewards programs, digital currencies) without having to make changes to the POS system. Once a merchant integrates its operations with the PPCEP, software updates, additional payment methods and value added programs may be added remotely (e.g., via a cloud architecture) without having to change hardware, make onsite visits, disrupt operations, and/or the like. Furthermore, by not having access to payment information POS system makers may have less risk of being hacked and may avoid having to go through expensive audits associated with making systems that have access to payment information. Additionally, the PPCEP may facilitate delivery of promotional information to customers. Using information regarding the current transaction, regarding previous purchases made by a customer, regarding location and/or time, and/or the like the PPCEP may determine relevant promotional material that may be presented to the customer. Such promotional material may include advertisements, offers, coupons, and/or the like.

DETAILED DESCRIPTION OF THE PPCEP

Figure 1:
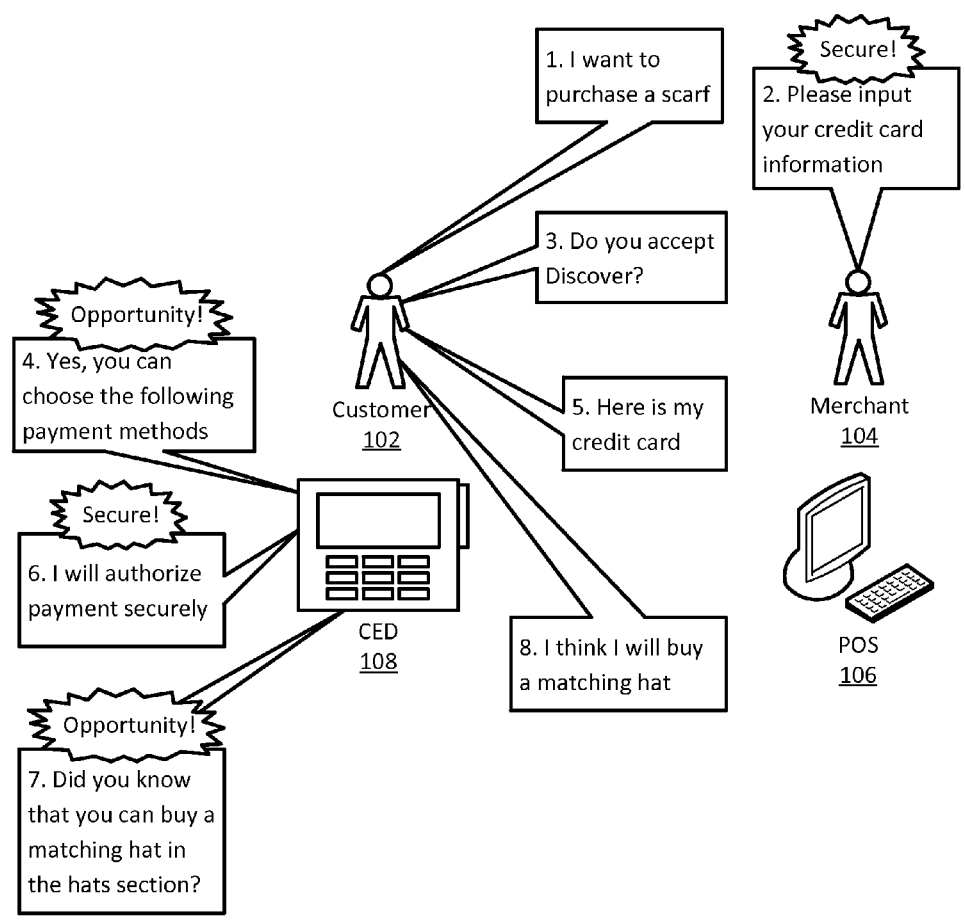
FIG. 1 shows an exemplary usage scenario in one embodiment of the PPCEP.

FIG. 1 shows an exemplary usage scenario in one embodiment of the PPCEP. In FIG. 1, a customer 102 may wish to purchase a scarf. Instead of providing a merchant 104 with payment information (e.g., handing a cashier a credit card), the customer may input payment information (e.g., swipe a credit card) via a CED 108. Avoiding having the merchant's cashier handle payment information may improve security, as the risk of the cashier misusing the payment information (e.g., recording payment information and selling it to identity thieves) is eliminated.

The customer may wish to use a preferred payment method (e.g., a Discover credit card). The PPCEP facilitates adding support for new payment methods without having to make changes to the merchant's POS system 106. This allows merchants to add support for new payment methods quickly as the software of the POS system does not have to be modified to add support for a new payment method. Consequently, the merchant may be encouraged to support more payment methods and may add support for new payment methods quicker, resulting in higher customer satisfaction. Furthermore, the PPCEP may steer the customer to using a payment method preferred by the merchant. For example, the PPCEP may order payment methods in a specified way and/or reward the customer for using a specified payment method. This may allow the merchant to reduce costs (e.g., by having the customer utilize a payment method with a lower transaction cost), improve customer satisfaction (e.g., by allowing the customer to pay with reward points instead of by charging to a credit card), increase customer loyalty (e.g., by providing the customer with a coupon for choosing a specified payment method), and/or the like.

Once the customer provides payment information via the CED the PPCEP may securely authorize the payment. Instead of having the merchant's POS system handle the payment information, the payment information may be handled by the PPCEP via a secure infrastructure. Avoiding having the merchant's POS system handle payment information may improve security, as the risk of the POS system being hacked and the payment information being stolen is eliminated.

Additionally, the PPCEP may facilitate delivery of promotional information to customers. For example, information regarding the current transaction (e.g., the customer purchased a scarf) and regarding the merchant (e.g., the merchant sells a matching hat) may be utilized to inform the customer regarding another item (e.g., the matching hat) that the customer may wish to purchase. This may result in improved customer satisfaction (e.g., the customer may be looking to buy a matching hat, but may not be aware that the merchant sells it), increased sales (e.g., customers may purchase more items from the merchant), enhanced communication with the customer (e.g., the customer may be shown informational messages and/or advertisements), and/or the like.

Figure 2:
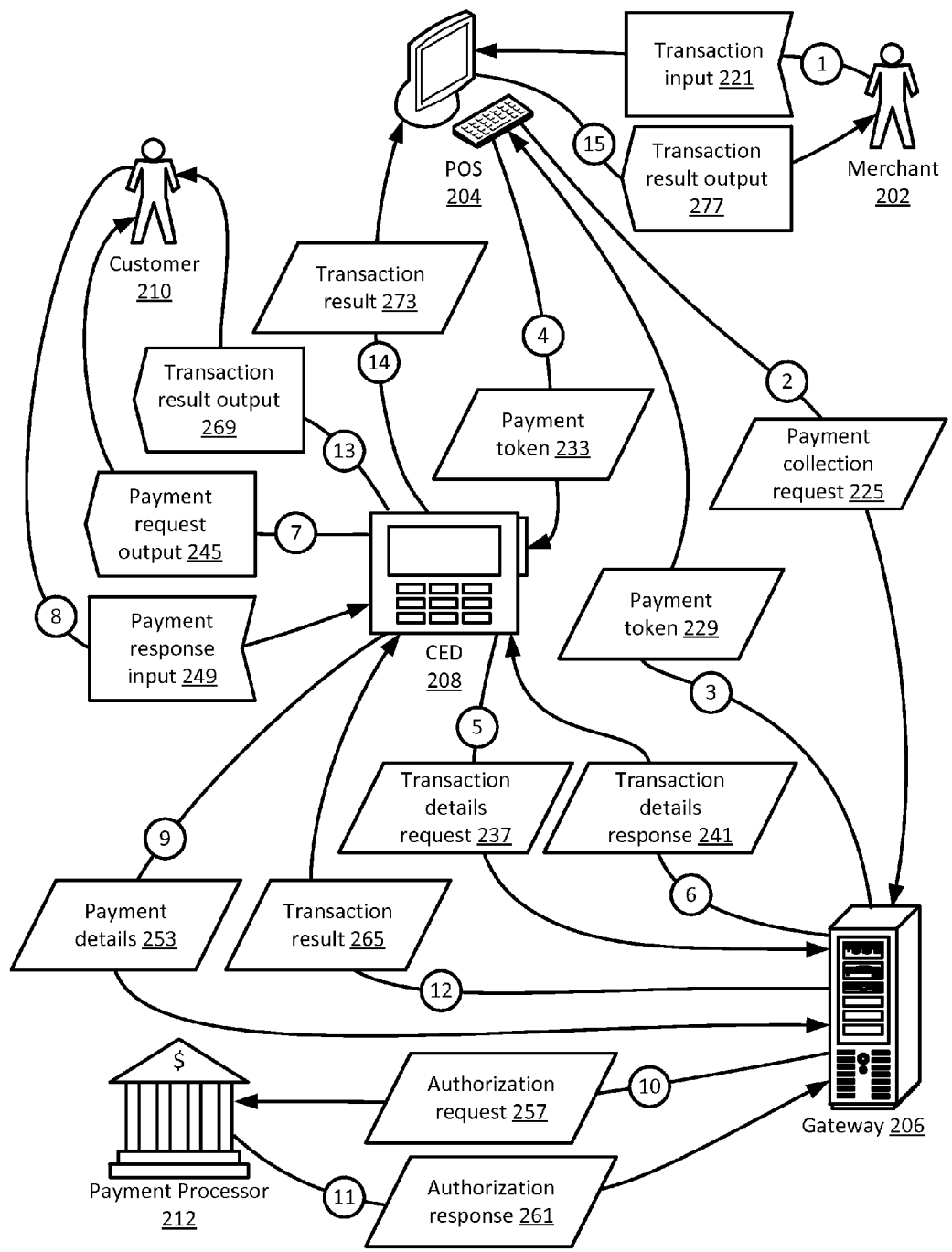
FIG. 2 shows a transaction handling data flow diagram in one embodiment of the PPCEP.

FIG. 2 shows a transaction handling data flow diagram in one embodiment of the PPCEP. FIG. 2 provides an example of how data may flow to, through, and/or from the PPCEP during transaction (e.g., purchase transaction) handling. In FIG. 2, a merchant 202 may input transaction information 221 via a POS system 204. The merchant may use a peripheral device (e.g., a keyboard, a mouse, a touchscreen, a barcode scanner) of the merchant's POS system to input the transaction information. For example, the transaction information may include data such as a customer identifier (e.g., based on a merchant's loyalty card number, based on a customer's phone number), stock keeping unit (SKU) level data (e.g., an item's SKU number, an item's Universal Product Code (UPC) number) regarding items (e.g., including goods and/or services) being purchased by a customer, item quantities, item prices, total purchase amount, and/or the like.

The POS system may send a payment collection request 225 to a PPCEP gateway 206. For example, the payment collection request may include data such as authentication credentials, a transaction identifier, a merchant identifier, location (e.g., geographic location, location within a store), a department identifier, a customer identifier, SKU level data regarding items being purchased by a customer, item quantities, item prices, total purchase amount, transaction date, transaction time, and/or the like. In one implementation, the payment collection request may be in XML format substantially in the following form:

```
<XML>
    <PaymentCollectionRequest>
        <AuthenticationCredentials>Credentials
        </AuthenticationCredentials>
        <TransactionID>ID_Transaction</TransactionID>
        <TransactionType>Purchase</TransactionType>
        <POS_ID>ID_POS</POS_ID>
        <ClerkID>ID_Clerk</ClerkID>
        <Order>
            <OrderID>ID_Order</OrderID>
            <TotalAmount>$60</TotalAmount>
            <Item>
                <ItemID>ID_Item</ItemID>
                <ItemName>Scarf</ItemName>
                <ItemQuantity>2</ItemQuantity>
                <ItemPrice>$30</ItemPrice>
            </Item>
        </Order>
    </PaymentCollectionRequest>
</XML>
```

In one embodiment, the POS system may be aware of the PPCEP, and the payment collection request may be directed to the gateway. In another embodiment, the POS system may be a legacy system that is not aware of the PPCEP, and the payment collection request may be directed to a payment collection peripheral device (e.g., a magnetic card reader) to obtain payment information. In one implementation, the gateway may emulate the payment collection peripheral device. In another implementation, a CED 208 may emulate the payment collection peripheral and may act as an intermediary that facilitates communication between the POS and the gateway.

The gateway may send a payment token 229 to the POS system. In the embodiment in which the POS system is aware of the PPCEP, the payment token may be in any desired format (e.g., an alphanumeric identifier). In the embodiment in which the POS system is not aware of the PPCEP, the payment token may be in a format that simulates payment information expected by the POS system from the payment collection peripheral device (e.g., a sixteen-digit credit card number). In some implementations, the payment token may be a onetime use and/or a time expiring token. For example, the payment token may be used in conjunction with the CED's identifier to authenticate the CED with the gateway and validate that the CED is assigned to the merchant that obtained the payment token. This may help improve security by keeping the authentication credentials out of the CED and the rest of the transaction flow.

The POS system may send the payment token 233 to the CED. In the embodiment in which the POS system is aware of the PPCEP, the payment token may be directed to the CED. In the embodiment in which the POS system is not aware of the PPCEP, the payment token may be included in a message directed to a payment processor to authorize a transaction. In this embodiment, the CED may emulate the payment processor and extract the payment token from the message (e.g., from the credit card number field of the message).

The CED may send a transaction details request 237 to the gateway. The transaction details request may prompt the gateway to provide the CED with details regarding the transaction, with promotional material (e.g., advertisements, coupons, identifiers of advertisements and/or coupons to present to a customer), and/or the like. For example, the transaction details request may include data such as a CED identifier, a payment token, a CED location (e.g., geographic location, location within a store), a department identifier, transaction date, transaction time, and/or the like. In one implementation, the transaction details request may be in XML format substantially in the following form:

```
<XML>
    <TransactionDetailsRequest>
        <CED_ID>ID_CED</CED_ID>
        <PaymentToken> M1_POS2_2013JAN01_12345
        </PaymentToken>
    </TransactionDetailsRequest>
</XML>
```

The gateway may send a transaction details response 241 to the CED. The transaction details response may include data regarding the transaction (e.g., a transaction identifier, a customer identifier, SKU level data regarding items being purchased by a customer, item quantities, item prices, total purchase amount), promotional material (e.g., advertisements, coupons, identifiers of advertisements and/or coupons to present to a customer), and/or the like. In one implementation, the transaction details response may be in XML format substantially in the following form:

```xml
<XML>
    <TransactionDetailsResponse>
        <TransactionID>ID_Transaction</TransactionID>
        <TransactionType>Purchase</TransactionType>
        <POS_ID>ID_POS</POS_ID>
        <ClerkID>ID_Clerk</ClerkID>
        <Order>
            <OrderID>ID_Order</OrderID>
            <TotalAmount>$60</TotalAmount>
            <Item>
                <ItemID>ID_Item</ItemID>
                <ItemName>Scarf</ItemName>
                <ItemQuantity>2</ItemQuantity>
                <ItemPrice>$30</ItemPrice>
            </Item>
        </Order>
        <PromotionalMaterial>
            <Coupon>ID_Coupon</Coupon>
        </PromotionalMaterial>
    </TransactionDetailsResponse>
</XML>
```

The CED may provide a payment request output 245 to a customer 210. In one embodiment, the payment request output may include promotional material. In various implementations, the promotional material may be in video, image, textual, audio, digital code, physical and/or the like format. For example, the promotional material may be a video advertisement. In another example, the promotional material may be a discount offer or a coupon (e.g., in the form of a digital QR code, in the form of a printed out coupon). In another embodiment, the payment request output may prompt the customer to provide payment information.

The customer may provide a payment response input 249 via the CED. For example, the customer may select a payment method (e.g., using a touchscreen of the CED) and/or provide payment details (e.g., swipe a credit card, use a mobile wallet via a smartphone with NFC support). The customer may also use the CED to provide additional information (e.g., a signature, a PIN, a password, a zip code).

The CED may send payment details 253 to the gateway. The payment details may include data provided by the customer (e.g., a credit card number). The payment details may also include additional information (e.g., a signature, a PIN, a password, a zip code) requested by the gateway. In one implementation, the payment details may be in XML format substantially in the following form:

```xml
<XML>
    <PaymentDetails>
        <CED_ID>ID_CED</CED_ID>
        <PaymentToken> M1_POS2_2013JAN01_12345
        </PaymentToken>
        <TransactionID>ID_Transaction</TransactionID>
        <TransactionType>Purchase</TransactionType>
        <Payment>
            <PaymentType>Card</PaymentType>
            <CardNumber>Card number</CardNumber>
        </Payment>
    </PaymentDetails>
</XML>
```

The gateway may send an authorization request 257 to a payment processor 212. The payment processor may be an entity that authorizes payment (e.g., based on correctness of provided information and/or fraud risk assessment). For example, the payment processor may be First Data Resources (FDR), Guardian Payment Systems (GPS), Smart Technology Solutions (STS), LevelUp, PayPal, and/or the like. In one implementation, the authorization request may be in XML format substantially in the following form:

```xml
<XML>
    <AuthorizationRequest>
        <TransactionID>ID_Transaction</TransactionID>
        <TransactionType>Purchase</TransactionType>
        <TotalAmount>$60</TotalAmount>
        <MerchantDetails>Clothing store, the store's zip code</MerchantDetails>
        <Payment>
            <PaymentType>Card</PaymentType>
            <CardNumber>Card number</CardNumber>
        </Payment>
    </AuthorizationRequest>
</XML>
```

The payment processor may send an authorization response 261 to the gateway. The authorization response may include an indicator of whether a payment was authorized (e.g., authorized, denied), a request for additional information (e.g., a signature, a PIN, a password, a zip code), and/or the like. In one implementation, the authorization response may be in XML format substantially in the following form:

```xml
<XML>
    <AuthorizationResponse>
        <TransactionID>ID_Transaction</TransactionID>
        <TransactionStatus>Authorized</TransactionStatus>
        <Payment>
            <PaymentType>Card</PaymentType>
            <CardType>Discover</CardType>
            <IsCredit>Yes</IsCredit>
            <IsDebit>Yes</IsDebit>
            <IsCorporate>No</IsCorporate>
            <RewardPoints>
                <RewardPointsAvailable>Yes
                </RewardPointsAvailable>
                <RewardPointsAmount>$20
                </RewardPointsAmount>
            </RewardPoints>
        </Payment>
    </AuthorizationResponse>
</XML>
```

The gateway may send a transaction result 265 to the CED. The transaction result may include an indicator of whether the payment was authorized (e.g., authorized, denied), a request for additional information (e.g., a signature, a PIN, a password, a zip code), a request for an additional payment method (e.g., in case the payment was denied and/or total purchase amount not paid in full), additional promotional material, and/or the like. In one implementation, the transaction result may be in XML format substantially in the following form:

```xml
<XML>
    <TransactionResult>
        <TransactionID>ID_Transaction</TransactionID>
        <TransactionType>Purchase</TransactionType>
        <TransactionStatus>Authorized</TransactionStatus>
        <PromotionalMaterial>
            <Advertisement>ID_Advertisement</Advertisement>
        </PromotionalMaterial>
    </TransactionResult>
</XML>
```

The CED may provide a transaction result output 269 to the customer. In one embodiment, the transaction result output may include promotional material. In various implementations, the promotional material may be in video, image, textual, audio, digital code, physical and/or the like format. For example, the promotional material may be a coupon that the customer may use the next time the customer shops with the merchant. In another embodiment, the transaction result output may include an indicator (e.g., via a display of the CED) of whether the transaction has been successfully completed (e.g., transaction approved, transaction failed), a receipt, and/or the like.

The CED may provide a transaction result 273 to the POS system. The transaction result may include an indicator of whether the payment was authorized (e.g., authorized, denied). In one implementation, the transaction result may be in XML format substantially in the following form:

```
<XML>
    <TransactionResult>
        <TransactionID>ID_Transaction</TransactionID>
        <TransactionType>Purchase</TransactionType>
        <TransactionStatus>Authorized</TransactionStatus>
    </TransactionResult>
</XML>
```

The POS system may provide a transaction result output 277 to the merchant. For example, the transaction result output may include an indicator (e.g., via a display of the POS system) of whether the transaction has been successfully completed (e.g., transaction approved, transaction failed), a receipt, and/or the like.

Figure 3:
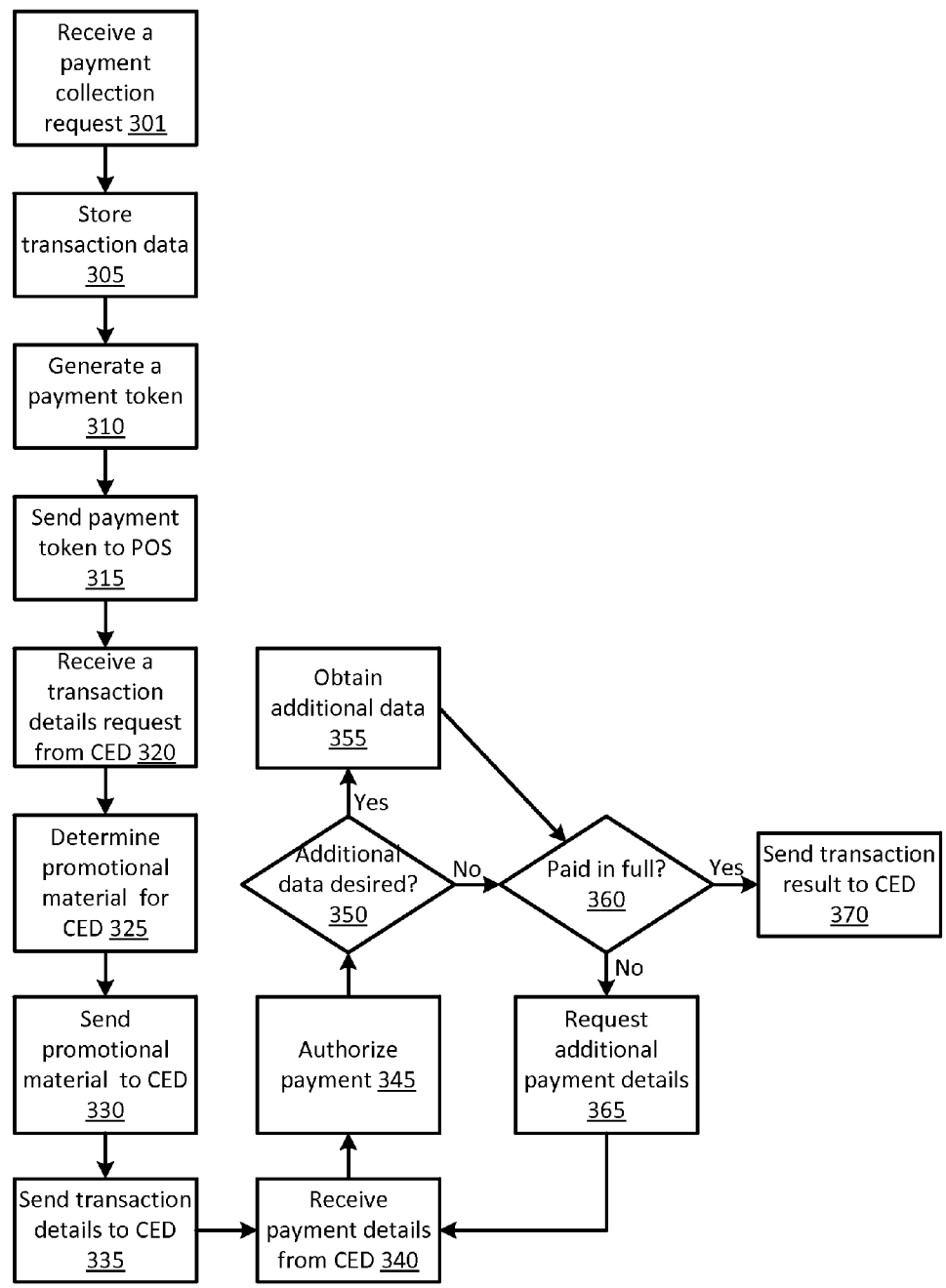
FIG. 3 shows a logic flow diagram illustrating a gateway transaction processing (GTP) component in one embodiment of the PPCEP.

FIG. 3 shows a logic flow diagram illustrating a gateway transaction processing (GTP) component in one embodiment of the PPCEP. For example, the GTP component may be used to facilitate transaction processing by a gateway. In FIG. 3, a payment collection request may be received at 301. For example, the payment collection request may be received from a merchant's POS system via a network device and may include transaction data.

The transaction data may be parsed from the payment collection request (e.g., via an XML parser) and may be stored by the PPCEP (e.g., in the transactions data store 1230*c*) at 305. The transaction data may include information such as a customer identifier, SKU level data regarding items being purchased by a customer, item quantities, item prices, total purchase amount, and/or the like. In some embodiments, the transaction data may be merged with historical data (e.g., data regarding previous purchases made by the customer associated with the transaction). In some implementations, such merging may occur (e.g., via one or more SQL queries) after a payment method is obtained (e.g., to merge the transaction data with historical data regarding previous purchases made using the payment method).

A payment token associated with the stored transaction data may be generated at 310. In one embodiment, the merchant's POS system may be aware of the PPCEP, and the payment token may be in any desired format. For example, the payment token may comprise a merchant identifier (e.g., M1), a POS system identifier (e.g., POS2), a transaction date (e.g., 2013JAN1), and a counter that increases with each transaction and resets each day (e.g., 12345). In this example a payment token may be M1_POS2_2013JAN1_12345. In another embodiment, the merchant's POS system may be a legacy system that is not aware of the PPCEP, and the payment token may be in a format that simulates payment information expected by the POS system from a payment collection peripheral device. For example, the payment token may be a sixteen-digit number (e.g., to simulate a credit card number) that is a counter that increases with each transaction and resets each day. In this example a payment token may be 0000 0000 0001 2345. The payment token may be sent to the POS system at 315.

A transaction details request may be received from a CED at 320. The transaction details request may include the payment token to allow the gateway to access the associated transaction data. The transaction details request may also include data such as a CED location (e.g., geographic location, location within a store), a department identifier, a date, a time, and/or the like. In one embodiment, these data, the associated transaction data, historical data associated with the customer and/or the payment method, and/or the like may be used by the PPCEP to determine promotional material (e.g., stored in the promotions data store 1230*d*) for the CED at 325. For example, if the associated transaction data indicates that the customer is purchasing two sweaters, the PPCEP may determine that the customer should be offered a 30% off coupon for a third sweater to encourage the customer to purchase an additional item. In another example, if historical data indicates that the customer tends to purchase coffee at the time of the transaction and the location of the CED indicates that the customer is near a coffee machine, the PPCEP may determine that the customer should be informed that a coffee machine is nearby. See FIG. 5 for additional details regarding determining promotional material for the CED. In another embodiment, these data, the associated transaction data, historical data associated with the customer and/or the payment method, and/or the like may be used by the PPCEP to make analytical deductions and/or suggestions. For example, the PPCEP may calculate an average price for an item based on geographic location, Standard Industrial Classification (SIC) code, business type (e.g., retail, mail order, telephone order), and/or the like. This may be used to show customers a map with nearby businesses that sell a particular (e.g., customer-specified) item and display the average and/or latest sale price and/or show whether the item is in stock. In another example, the PPCEP may utilize analytical data to help merchants improve sales (e.g., by suggesting similar items that are more cost effective and/or popular with customers than items currently sold by the merchant, suggesting complimentary items to items currently sold by the merchant). In yet another example, the PPCEP may utilize analytical data to help manufacturers improve sales (e.g., manufacturers may advertise via the PPCEP in stores where such advertising may be effective based on items currently sold by the merchant).

The promotional material may be sent to the CED at 330. In one embodiment, the content (e.g., video files, image files, text files, audio files) associated with the promotional material may be sent and/or streamed to the CED. In another embodiment, the content may be located at the CED and an identifier of the promotional material to be provided to the customer may be sent. The gateway may send transaction details to the CED at 335. The transaction details may include the associated transaction data (e.g., a transaction identifier, a customer identifier, SKU level data regarding items being purchased by a customer, item quantities, item prices, total purchase amount) stored by the PPCEP.

Payment details may be received from the CED at 340. The payment details may include data regarding the payment method utilized by the customer (e.g., a debit card number). The gateway may authorize payment at 345. For example, the gateway may contact a payment processor and request that the payment processor authorize the payment. In another example, the gateway may be capable of authorizing the payment on its own.

A determination may be made at 350 whether additional data is desired. For example, if the payment method is a credit card, the customer's signature may be desired. In another example, if the payment method is a debit card, a PIN may be desired. If it is determined that additional data is desired, such additional data may be obtained at 355. For example, the gateway may contact the CED and request that the CED provide such additional data (e.g., by prompting the customer to provide such additional data). In some implementations, payment may be authorized upon receiving such additional data.

A determination may be made at 360 whether the total purchase amount associated with the transaction has been paid in full. For example, if the customer is using a credit card, the customer may pay the total purchase amount with the credit card. In another example, if the customer is using a gift card, the customer may pay the amount available on the gift card and may have an outstanding balance remaining. If it is determined that the total purchase amount has not been paid in full, a request for an additional payment method may be made to the CED at 365, and another payment method may be processed. If it is determined that the total purchase amount has been paid in full, a transaction result may be sent to the CED at 370. For example, the transaction result may include a confirmation that the payment was authorized, additional promotional material, and/or the like.

Figure 4:
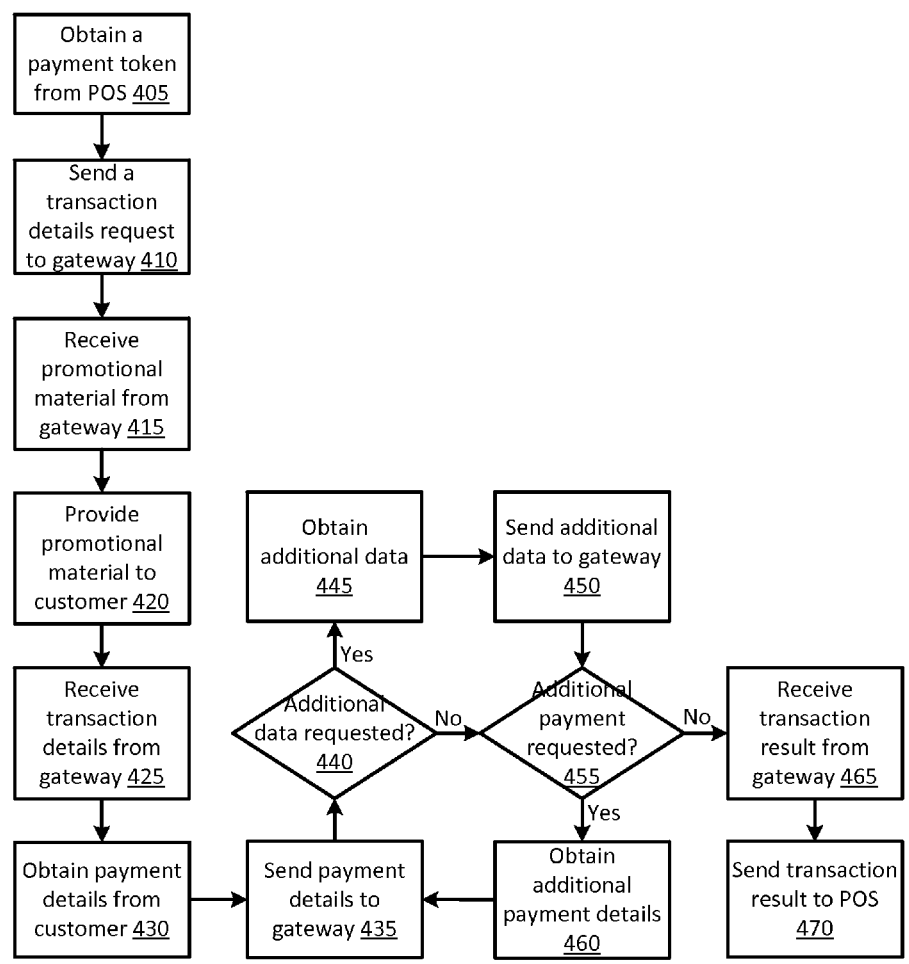
FIG. 4 shows a logic flow diagram illustrating a CED transaction processing (CTP) component in one embodiment of the PPCEP.

FIG. 4 shows a logic flow diagram illustrating a CED transaction processing (CTP) component in one embodiment of the PPCEP. For example, the CTP component may be used to facilitate transaction processing by a CED. In FIG. 4, a payment token may be obtained from a merchant's POS system via a network device at 405. The payment token may identify a transaction for which payment is to be obtained (e.g., from a customer).

The CED may send a transaction details request to a gateway at 410. The transaction details request may prompt the gateway to provide the CED with details regarding the transaction, with promotional material, and/or the like, and may include data such as the payment token, the CED's location (e.g., geographic location, location within a store), an identifier of the department in which the CED is located, transaction date, transaction time, and/or the like.

At 415, the CED may receive promotional material from the gateway. In one embodiment, the content (e.g., video files, image files, text files, audio files) associated with the promotional material may be received and/or streamed by the CED. In another embodiment, the content may be located at the CED and an identifier of the promotional material to be provided to the customer may be received. The CED may provide the promotional material to the customer at 420. For example, the CED may play back a video advertisement via its screen and/or speaker. In another example, the CED may display an offer that the customer may utilize (e.g., by purchasing additional and/or different items, by providing contact information such as an email address and/or a phone number in exchange for a $5 discount). In yet another example, the CED may display and/or print out a coupon that the customer may use (e.g., by taking an image of the coupon via a mobile device and showing the image to a merchant on the mobile device's screen, by scanning a Quick Response (QR) code that directs the customer's mobile device to a URL that adds a coupon to the customer's mobile wallet, by presenting a merchant with a physical coupon).

The CED may receive transaction details from the gateway at 425. The transaction details may include transaction data (e.g., a transaction identifier, a customer identifier, SKU level data regarding items being purchased by a customer, item quantities, item prices, total purchase amount) associated with the payment token.

At 430, the CED may prompt the customer to provide payment for the total purchase amount (e.g., shown on the CED screen) and may obtain payment details from the customer. In various embodiments, the customer may provide payment details via a payment tool by swiping (e.g., a credit card, a debit card), waving (e.g., an NFC contactless card), tapping (e.g., a mobile device with a digital wallet), scanning (e.g., a QR code), and/or the like. See FIG. 6 for additional details regarding obtaining payment details from the customer.

The CED may send the payment details to the gateway at 435. The payment details may include data regarding the payment method utilized by the customer (e.g., a gift card number). A determination may be made at 440 whether additional data is requested by the gateway. For example, if the payment method is a digital wallet, the customer's zip code may be desired. If it is determined that additional data is requested, such additional data may be obtained from the customer at 445. For example, the customer may be informed what additional data is requested and may be prompted to input such additional data (e.g., via a keyboard of the CED). The additional data may be sent to the gateway at 450.

A determination may be made at 455 whether an additional payment method is requested by the gateway. For example, if the provided payment method was not authorized, the customer may be requested to provide another payment method. In another example, if the provided payment method (e.g., a coupon) paid for a portion of the total purchase amount the customer may be requested to provide another payment method to pay for the remaining balance. If it is determined that an additional payment method is requested, payment details for the additional payment method may be obtained at 460. For example, the CED may display the remaining balance and prompt the customer to provide payment details in a similar manner as discussed with regard to 430.

If an additional payment method is not requested, a transaction result may be received from the gateway at 465. For example, the transaction result may include confirmation that the payment was authorized, additional promotional material, and/or the like. The confirmation and/or the additional promotional material may be provided to the customer. A transaction result may be sent to the merchant's POS system at 470.

Figure 5:
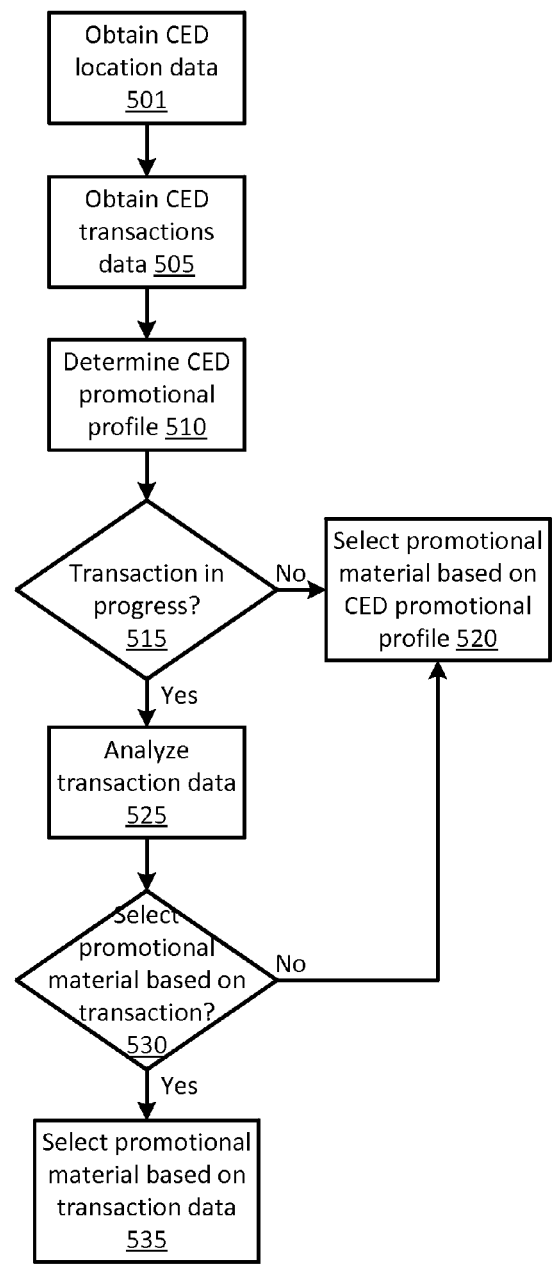
FIG. 5 shows a logic flow diagram illustrating a promotional material handling (PMH) component in one embodiment of the PPCEP.

FIG. 5 shows a logic flow diagram illustrating a promotional material handling (PMH) component in one embodiment of the PPCEP. For example, the PMH component may be used to select promotional material to provide via a CED. In FIG. 5, CED location data may be obtained at 501. For example, the CED location data may include a merchant category identifier (e.g., a merchant selling clothing, a merchant selling food), a location within a store (e.g., a department in which the CED is located), demographic data associated with the geographic location of the CED, and/or the like. CED transactions data may be obtained at 505. For example, the CED transaction data may include historical transactions that were handled by the CED, by other CEDs in the department, by other CEDs in the store, and/or the like.

A promotional profile for the CED may be determined at 510. In one embodiment, the CED location data and the CED transactions data may be analyzed to make this determination. For example, the promotional profile may comprise promotional material appropriate for the CED determined based on analysis of these data (e.g., based on a score for a promotional material exceeding a specified threshold). In one implementation, appropriate promotional material may be determined based on likely popularity of the promotion at the CED. For example, promotional material regarding hats may be appropriate for a CED in a scarves department of a clothing store, especially if historical transactions data indicates that customers tend to purchase hats and scarves together. In another implementation, appropriate promotional material may be determined based on advertisers' specifications. For example, if a credit card provider (e.g., Discover) wishes to advertise Discover credit cards in food stores, Discover's promotional material may be appropriate for a CED located in a food store.

A determination may be made at 515 whether a transaction is in progress at the CED. For example, if a transaction is not in progress, the CED may display non-transaction specific promotional material (e.g., an advertisement for a Discover credit card). In another example, if a transaction is in progress, the CED may display transaction-specific promotional material (e.g., a coupon for 10% off a matching hat).

If a transaction is not in progress at the CED, promotional material for the CED may be selected based on the promotional profile for the CED at 520. For example, a random advertisement may be selected from the appropriate promotional material. In another example, the CED may cycle through the appropriate promotional material.

If a transaction is in progress at the CED, transaction data may be analyzed at 525 to determine appropriate promotional material that is relevant to the transaction (e.g., based on the SKU level data regarding items being purchased by a customer, item quantities, item prices, total purchase amount). If it is determined at 530 that promotional material should not be selected based on the transaction data (e.g., promotional material related to items being purchased is not available), promotional material for the CED may be selected based on the promotional profile for the CED at 520. If it is determined at 530 that promotional material should be selected based on the transaction data, promotional material for the CED may be selected based on the transaction data at 535. For example, promotional material (e.g., a coupon) associated with one of the items being purchased by a customer may be selected. In another example, promotional material (e.g., a promotional video) regarding an item related to one of the items being purchased by a customer may be selected. Factors such as a customer's purchase history, a customer's promotional material redemption history, payment method utilized by a customer, and/or the like may also affect which promotional material is selected. For example, if a customer is more likely (e.g., based on historical data) to redeem a "buy 3 items get 1 free" offer than a "25% off all items" offer, the "buy 3 items get 1 free" offer may be selected.

Figure 6:
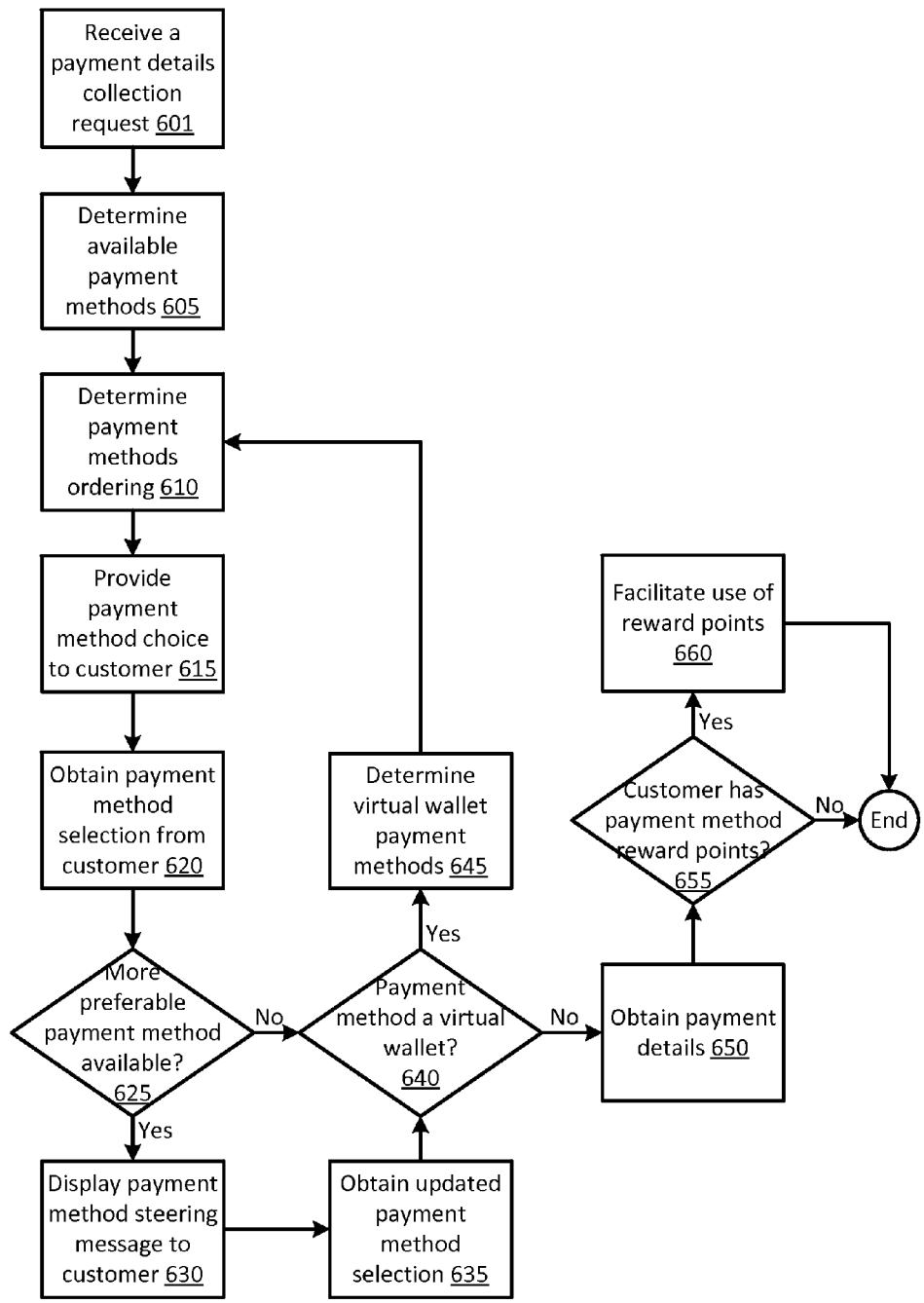
FIG. 6 shows a logic flow diagram illustrating a payment selection handling (PSH) component in one embodiment of the PPCEP.

FIG. 6 shows a logic flow diagram illustrating a payment selection handling (PSH) component in one embodiment of the PPCEP. For example, the PSH component may be used to obtain payment details from a customer. In FIG. 6, a payment details collection request may be received at 601 by a merchant's CED. For example, the payment details collection request may be sent by the PPCEP to facilitate collection of payment details from a customer during a purchase transaction. In one implementation, the payment details collection request may be a function call (e.g., a C++ function call).

Available payment methods may be determined at 605. For example, the available payment methods may be payment methods supported by the CED. In one embodiment, a payment method whose connection is slow or down may not be considered an available payment method. In another embodiment, different payment methods may be available depending on transaction characteristics. For example, credit cards may not be available for transactions with purchase amounts that are below a threshold (e.g., $10). In another example, reward points may be available when purchasing some items (e.g., regularly priced items), but not other items (e.g., items on sale).

A payment methods ordering may be determined at 610. The payment method ordering may indicate the merchant's preference for available payment methods that may be used to pay for the purchase transaction. For example, the payment methods ordering may be determined based on data stored in the payment methods data store 1230e. In one embodiment, the payment method ordering may be determined based on the cost of using the available payment methods. For example, if a first payment method has lower transaction costs to the merchant than a second payment method, the first payment method may be more preferable. In another embodiment, the payment method ordering may be determined based on branding. For example, the merchant may prefer merchant-branded payment methods (e.g., merchant branded credit cards, debit cards, and/or the like) over other payment methods. In yet another embodiment, the payment method ordering may be determined based on tracking and/or reporting capabilities associated with the available payment methods. For example, if a first payment method provides better tracking and/or reporting capabilities (e.g., SKU-level tracking and/or reporting) than a second payment method (e.g., transaction-level tracking and/or reporting), the first payment method may be more preferable.

At 615, the PPCEP may provide the customer with a payment method choice. For example, the customer may select which of the provided payment methods the customer wishes to use to pay for the purchase transaction. In one embodiment, the CED may display the provided payment methods in accordance with the payment method ordering. For example, more preferable payment methods may be shown first (e.g., listed on top, listed at the top left corner). In another example, more preferable payment methods may be shown in a more visually appealing manner (e.g., highlighted, embellished). In another embodiment, the CED may select the most preferable payment method for the user. For example, the most preferable payment method may be shown as default and/or selected by default. In another example, the CED may request payment details for the most preferable payment method, but may allow the customer to select a different payment method if the customer wishes to do so.

A payment method selection may be obtained from the customer at 620. For example, the customer may utilize the CED to select (e.g., via the CED's touchscreen) one of the provided payment methods. A determination may be made at 625 whether a payment method that is more preferable than the selected payment method is available. If a more preferable payment method is available, a payment method steering message may be provided (e.g., displayed) to the customer at 630. In one embodiment, the PPCEP may provide an informational message. For example, the customer may be informed regarding the benefits of using a more preferable payment method. In another embodiment, the PPCEP may provide incentives for using a more preferable payment method. In one implementation, such incentives may include discount offers, cash back offers, coupons, loyalty points, and/or the like. For example, the customer may be rewarded with cash back (e.g., 1% cash back) for using an Automated Clearing House (ACH) payment. In this example, transaction costs associated with the ACH payment may have a lower cost than transaction costs associated with a credit card payment, which allows rewarding the user for using the ACH payment while still saving money for the merchant. The customer's updated payment method selection may be obtained at 635. For example, the customer may select a more preferable payment method. In another example, the customer may continue using the originally selected payment method.

A determination may be made at 640 whether the selected payment method is a virtual wallet. A virtual wallet may include a plurality of payment methods. If the selected payment method is a virtual wallet, payment methods associated with the virtual wallet may be determined at 645. For example, an API of the virtual wallet provider may be utilized to make this determination. The associated payment methods may be ordered and one of them selected in a similar manner as discussed with regard to 610 through 635.

Payment details associated with the selected payment method may be obtained at 650. For example, the customer may be prompted via the CED to swipe a credit card. A determination may be made at 655 whether the customer has reward points associated with the selected payment method (e.g., a credit card). If the customer has reward points, the PPCEP may facilitate the use of reward points instead of or in addition to using the payment method (e.g., by allowing the customer to allocate the number of reward points that should be used). For example, if the customer has $20 in reward points for a selected credit card, the PPCEP may allow the customer to pay for a $30 scarf by using $20 in reward points and by charging $10 to the selected credit card.

Figure 7:
FIG. 7 shows an exemplary customer engagement device (CED) in one embodiment of the PPCEP.

FIG. 7 shows an exemplary customer engagement device (CED) in one embodiment of the PPCEP. In FIG. 7, the CED 701 may be utilized to collect payment via the supported payment methods. In some embodiments, payment methods supported by the CED may be added on the back end without having to make changes to the CED at a merchant's location. See FIGS. 8, 9, 10 and 11 for additional details regarding adding support for payment methods and/or adding features to the CED.

The CED may employ a payment method selection screen 705 (e.g., displayed via a touchscreen) to facilitate user (e.g., customer, payer) selection of a payment method. The payment method selection screen may display one or more supported payment methods, such as a Bank of America account 710. A payment method may also have an associated check mark 715. In one embodiment, the check mark may indicate whether the payment method may be used for the current transaction (e.g., reward points may be used to purchase some items, but not to purchase other items). In another embodiment, the check mark may indicate whether using the payment method would result in reward points being awarded (e.g., credited to a customer's loyalty account) for a purchase. In yet another embodiment, the check mark may indicate which payment methods have been selected by a customer to be utilized during the current transaction (e.g., the customer may wish to use multiple payment methods to pay for a purchase).

Upon selecting one or more payment methods, a user may use a "Submit" button 720 (e.g., by tapping on the button) to submit the payment method selection. A payment details acquisition device 725 may be utilized to obtain payment details from the user. In various implementations, the payment details acquisition device may be a card reader, a scanner, a contactless chip reader, and/or the like. A keyboard 730 may be utilized by the user to provide additional details (e.g., a PIN, a password, a zip code).

Figure 8:
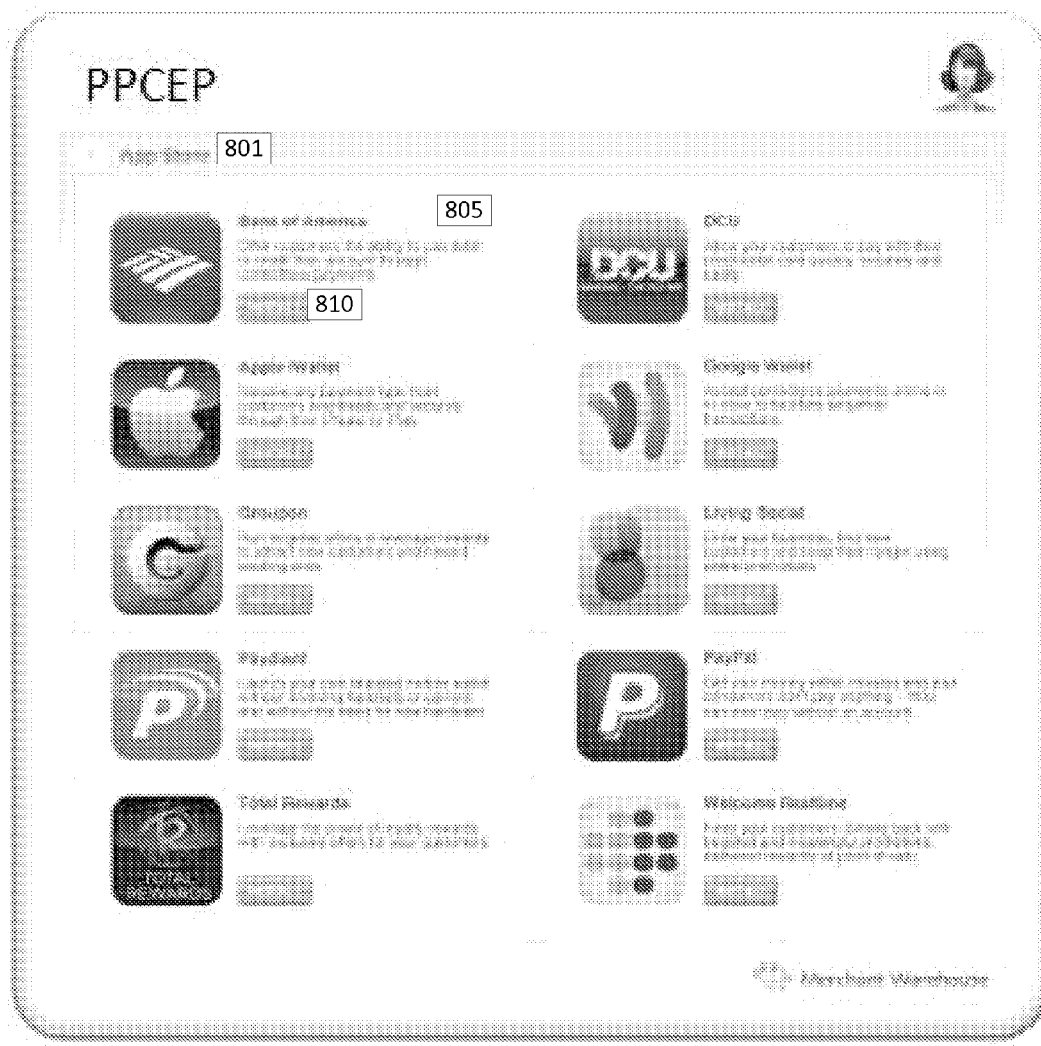
FIG. 8 shows a screen shot diagram illustrating an exemplary app store in one embodiment of the PPCEP.

FIG. 8 shows a screen shot diagram illustrating an exemplary app store in one embodiment of the PPCEP. In FIG. 8, an app store 801 may be utilized by a user (e.g., a merchant, a PPCEP administrator) to add support for one or more payment methods to a CED. In various embodiments, payment methods supported by the PPCEP may include cash, checks, mWallets, mCoupons, gift cards, debit cards, credit cards, QR codes, Electronic Benefit Transfer (EBT) cards, NFC cards, EMV cards, paper coupons, reward points, loyalty program discounts, promotional discounts, and/or the like.

For example, the user may use the app store to add support for a payment method to CEDs in a merchant's store. In one implementation, the user may add support for a payment method, such as a Bank of America account 805, by using (e.g., clicking on) an "Install" button 810 associated with the payment method. The PPCEP may seamlessly update the configuration of the affected CEDs to facilitate support for the installed payment method.

Figure 9:
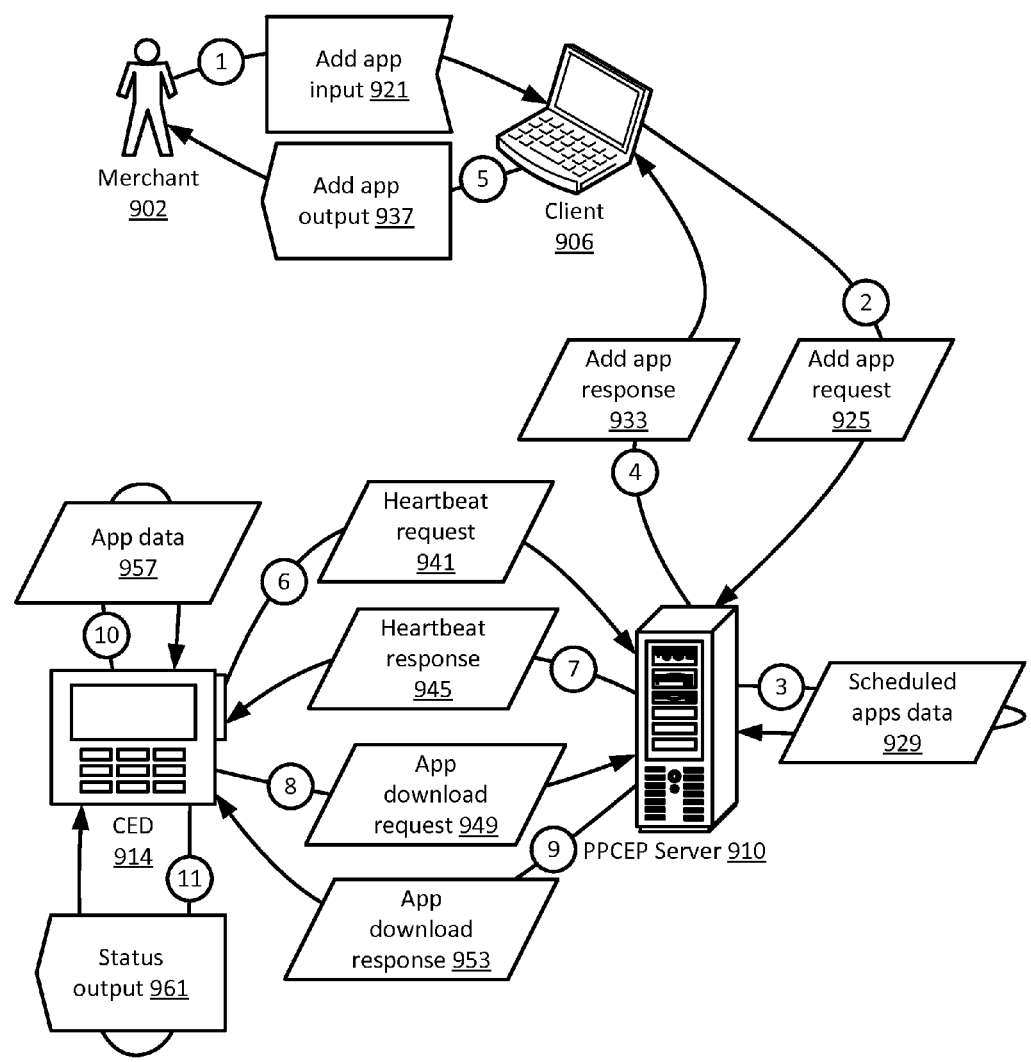
FIG. 9 shows an app support adding and installing data flow diagram in one embodiment of the PPCEP.

FIG. 9 shows an app support adding and installing data flow diagram in one embodiment of the PPCEP. FIG. 9 provides an example of how data may flow to, through, and/or from the PPCEP during app support adding and installing. In FIG. 9, a user such as a merchant 902 may indicate via a client 906 that an app should be added 921 to a CED 914. In one implementation, the merchant may utilize a peripheral device of the merchant's client to input instructions via a web-based application. For example, the add app input may include data such as identifier of one or more apps to add, identifiers of one or more CEDs on which the one or more apps should be installed, app parameters for the one or more CEDs, scheduled update time, and/or the like.

An add app request 925 may be sent from the client to a PPCEP server. In one embodiment, the PPCEP server may facilitate making apps available for downloading by CEDs. For example, the add app request may include data such as the merchant's login information, identifier of one or more apps to add, identifiers of one or more CEDs on which the one or more apps should be installed, app parameters for the one or more CEDs, scheduled update time, and/or the like. In one implementation, the add app request may be in XML format substantially in the following form:

```
<XML>
<AddAppRequest>
    <Login>Login Info</Login>
    <Apps>
        <App>
            <AppID>ID_App1</AppID>
            <CEDs>
                <CED>
                    <CEDID>ID_CED1</CEDID>
                    <Parameters>App Parameters 1</Parameters>
                    <UpdateTime>Date and/or time 1</UpdateTime>
                </CED>
                <CED>
                    <CEDID>ID_CED2</CEDID>
                    <Parameters>App Parameters 2</Parameters>
                    <UpdateTime>Date and/or time 2</UpdateTime>
```

```
            </CED>
        </CEDs>
    </App>
    <App>
        ...
    </App>
    </Apps>
</AddAppRequest>
</XML>
```

The PPCEP server may add scheduled apps data 929 to a data store of scheduled downloads. For example, the scheduled apps data may include an identifier of an app to add, an identifier of a CED, app parameters, scheduled update time, download settings, and/or the like. In one implementation, the scheduled apps data may be in XML format substantially in the following form:

```
<XML>
    <ScheduledApp>
        <AppID>ID_App1</AppID>
        <CEDID>ID_CED1</CEDID>
        <Parameters>App Parameters 1</Parameters>
        <UpdateTime>Date and/or time 1</UpdateTime>
        <DownloadSettings>FTP_Address<DownloadSettings>
    </ScheduledApp>
</XML>
```

The PPCEP server may send an add app response 933 to the merchant. For example, the add app response may indicate whether the add app response was successfully handled. In one implementation, the add app response may be in XML format substantially in the following form:

```
<XML>
    <AddAppRequest>
        <Status>OK</Status>
    </AddAppRequest>
</XML>
```

The client may provide an add app output 937 to the merchant. For example, the add app output may be a message indicating that the request to add the app was completed successfully.

The CED may periodically (e.g., every hour) send a heartbeat request 941 to the PPCEP server. For example, the heartbeat request may include data such as the identifier of the CED, the status of the CED, and/or the like. In one implementation, the heartbeat request may be in XML format substantially in the following form:

```
<XML>
    <HeartbeatRequest>
        <CEDID>ID_CED1</CEDID>
        <Status>OK</Status>
    </HeartbeatRequest>
</XML>
```

The PPCEP server may send a heartbeat response 945 to the CED. For example, the heartbeat response may include data such as the identifier of the PPCEP server, whether new and/or updated apps are available, download settings, and/or the like. In one implementation, the heartbeat response may be in XML format substantially in the following form:

```
<XML>
    <HeartbeatResponse>
        <ServerID>ID_Server</ServerID>
        <AppsAvailable>YES</AppsAvailable>
        <Apps>
            <App>
                <AppID>ID_App1</AppID>
                <Parameters>App Parameters 1</Parameters>
                <UpdateTime>Date and/or time 1</UpdateTime>
                <DownloadSettings>FTP_Address
                <DownloadSettings>
            </App>
        </Apps>
    </HeartbeatResponse>
</XML>
```

At the scheduled update time, the CED may send an app download request 949 to the PPCEP server. For example, the app download request may include data such as the identifier of the CED, the identifier of the app, app location, and/or the like. In one implementation, the app download request may be in XML format substantially in the following form:

```
<XML>
    <DownloadRequest >
        <CEDID>ID_CED1</CEDID>
        <AppID>ID_App1</AppID>
        <AppLocation>Directory and/or file name</AppLocation>
    </DownloadRequest>
</XML>
```

The PPCEP server may send an app download response 953 to the CED. For example, the PPCEP server may send the app (e.g., in a zip file). The CED may analyze app data 957 (e.g., app parameters) and install the app. The CED may output a status at 961. For example, the CED may display a status message (e.g., "New app installed successfully!") on its display.

Figure 10:
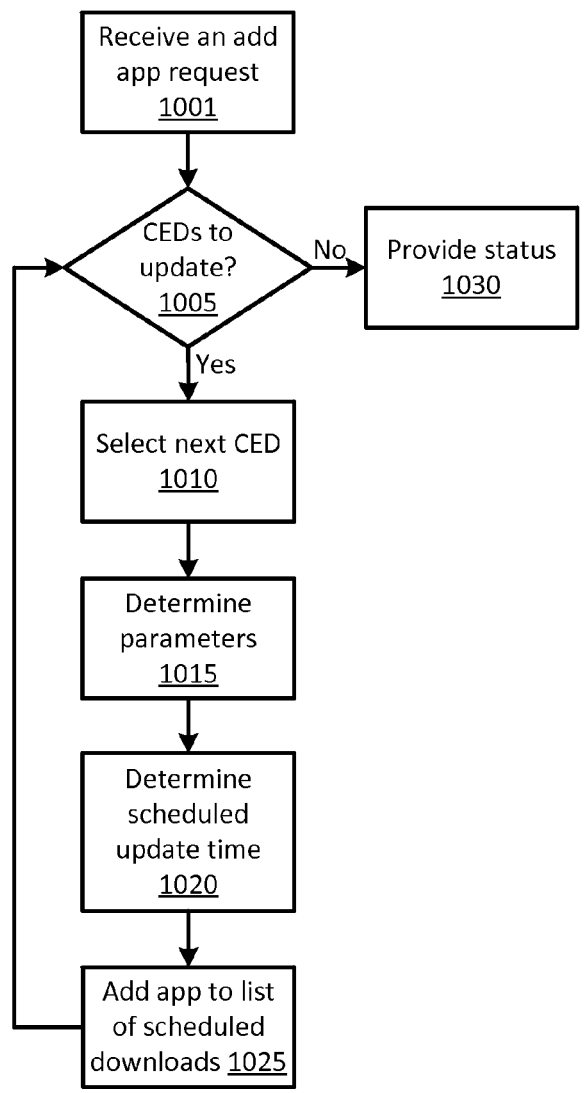
FIG. 10 shows a logic flow diagram illustrating an app support adding (ASA) component in one embodiment of the PPCEP.

FIG. 10 shows a logic flow diagram illustrating an app support adding (ASA) component in one embodiment of the PPCEP. For example, the ASA component may be used to facilitate adding app support to a CED. In FIG. 10, an add app request may be received at 1001. For example, a user (e.g., a merchant, a PPCEP administrator) may utilize the app store to add an app that facilitates acceptance of a payment method and/or adds a feature to the merchant's CEDs.

A determination may be made at 1005 whether there remain CEDs that should be scheduled for updating with the app. For example, the merchant may wish to update CEDs in one of the merchant's store locations. In one implementation, the CEDs field of the add app request may be examined to make this determination. If there remain CEDs that should be scheduled for updating, the next CED may be selected at 1010.

Parameters for updating the CED may be determined at 1015. In one embodiment, different types of CEDs supporting different sets of functionality may be utilized by the merchant. Accordingly, the app may be configured to provide functionality supported by the CED. In another embodiment, the merchant may wish different CEDs to support different sets of functionality (e.g., CED at the point of sale, CED at the customer service desk). Accordingly, the app may be configured to provide functionality requested by the merchant for the CED. For example, available functionality may include sale transactions, refund transactions, void transactions, cancel transactions, batch reports, and/or the like. In one implementation, the Parameters field of the add app request may be examined to make this determination.

The scheduled update time for the CED may be determined at 1020. For example, the merchant may specify a convenient update time (e.g., at night when the store is closed, staggered such that one CED at a time is unavailable due to updating) that would reduce or eliminate disruptions to the merchant's business operations. In one implementation, the UpdateTime field of the add app request may be examined to make this determination.

Information regarding the app, app parameters, scheduled update time for the CED, download settings, and/or the like data may be added to a data store (e.g., a list) of scheduled downloads at 1025. For example, this information may be stored in the apps data store 1230*f*. When the CED sends a heartbeat request to a PPCEP server, the CED may be informed that an app (e.g., stored in a zip file in a specified location) is available for the CED by examining the list of scheduled downloads (e.g., by searching for the CED's identifier in the list).

If there remain CEDs that should be scheduled for updating, the next CED may be handled. Otherwise, a status may be provided at 1030. For example, a response indicating that the add payment app request was successfully handled may be sent by the PPCEP server to the user's client.

Figure 11:
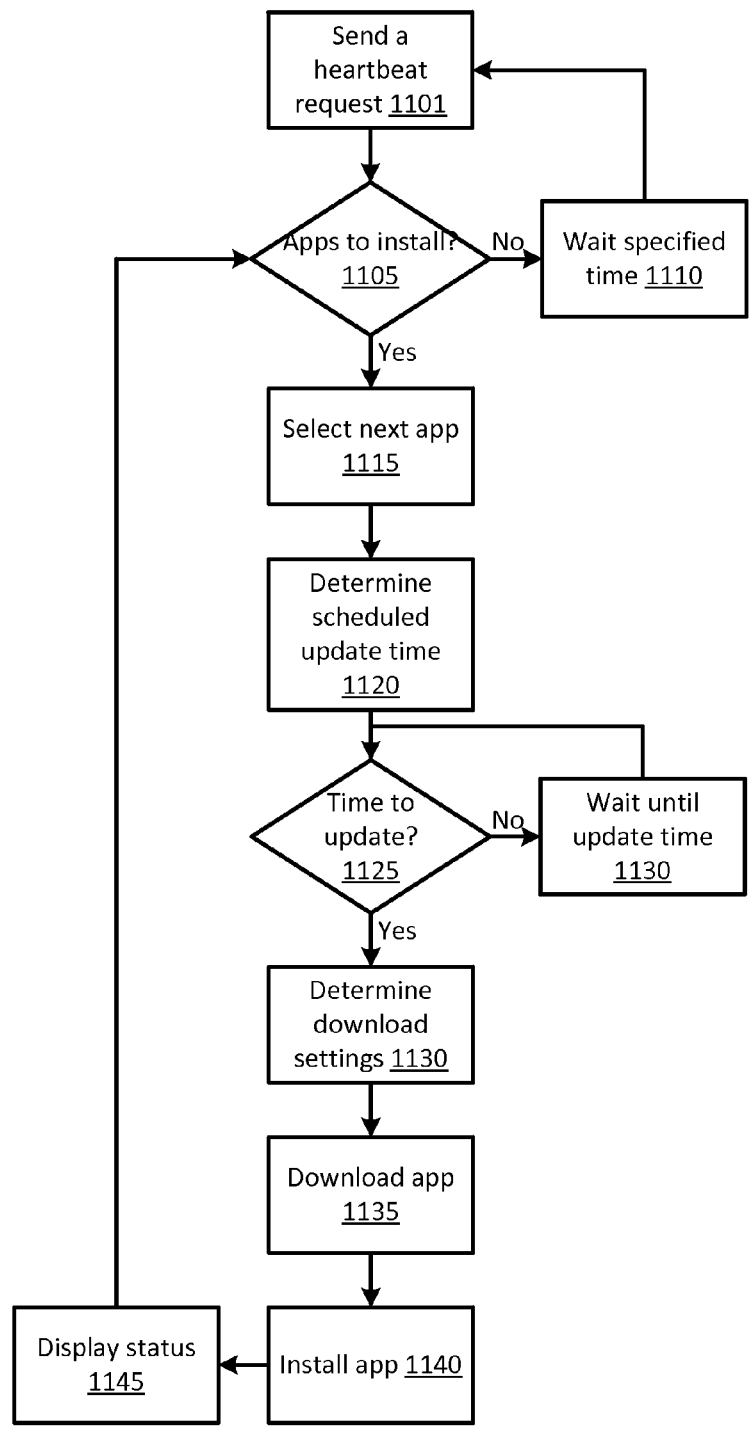
FIG. 11 shows a logic flow diagram illustrating an app support installing (ASI) component in one embodiment of the PPCEP.

FIG. 11 shows a logic flow diagram illustrating an app support installing (ASI) component in one embodiment of the PPCEP. For example, the ASI component may be used to facilitate installing an app on a CED. In FIG. 11, a heartbeat request 1101 may be sent by a CED to a PPCEP server. For example, the heartbeat request may confirm that the CED is operational, may provide the CED's status, may inquire regarding availability of new and/or updated apps, and/or the like. In one implementation, the heartbeat request may be sent periodically by the CED (e.g., every hour).

A determination may be made at 1105 whether there are new and/or updated apps to install. For example, a merchant may have scheduled installation of two new apps to facilitate acceptance of two new payment methods by the CED. In one embodiment, this determination may be made by examining a heartbeat response from the PPCEP server. In one implementation, the AppsAvailable field of the heartbeat response may be examined to make this determination.

If there are no apps to install, the CED may wait a specified period of time (e.g., an hour) to send the next heartbeat request. If there remain apps to install, the next app may be selected for installation at 1115. In one implementation, the Apps field of the heartbeat response may be examined to make this selection.

The scheduled update time to download and/or install the selected app may be determined at 1120. In one implementation, the UpdateTime field of the heartbeat response may be examined to make this determination. A determination may be made at 1125 whether it is time to update (e.g., whether the scheduled update time has come). If it not yet time to update, the CED may wait until update time at 1130. It is to be understood, that the CED may perform other tasks (e.g., handle purchase transactions, install other apps) while waiting for the update time.

If it is time to update, the CED may determine download settings at 1130. For example, the download settings may include data such as the IP address and/or port of the server (e.g., FTP server) storing the application, connection port (e.g., of the FTP server), location of the app (e.g., a directory and/or a file name), and/or the like. In one implementation, the DownloadSettings field of the heartbeat response may be examined to make this determination. The CED may download the app at 1135.

The CED may install the downloaded app at 1140. After installation, the payment method and/or feature provided by the app may be available on the CED. For example, the CED may be able to accept a new payment method (e.g., PayPal). In another example, the CED may be able to make use of a new feature (e.g., provide a QR coupon to a customer who utilizes a merchant preferred payment method).

The CED may display a status message at 1145. For example, the CED may inform a user (e.g., the merchant) regarding the status of the installation (e.g., new app installed successfully).

DETAILED DESCRIPTION OF THE PPCEP COORDINATOR

Figure 12:
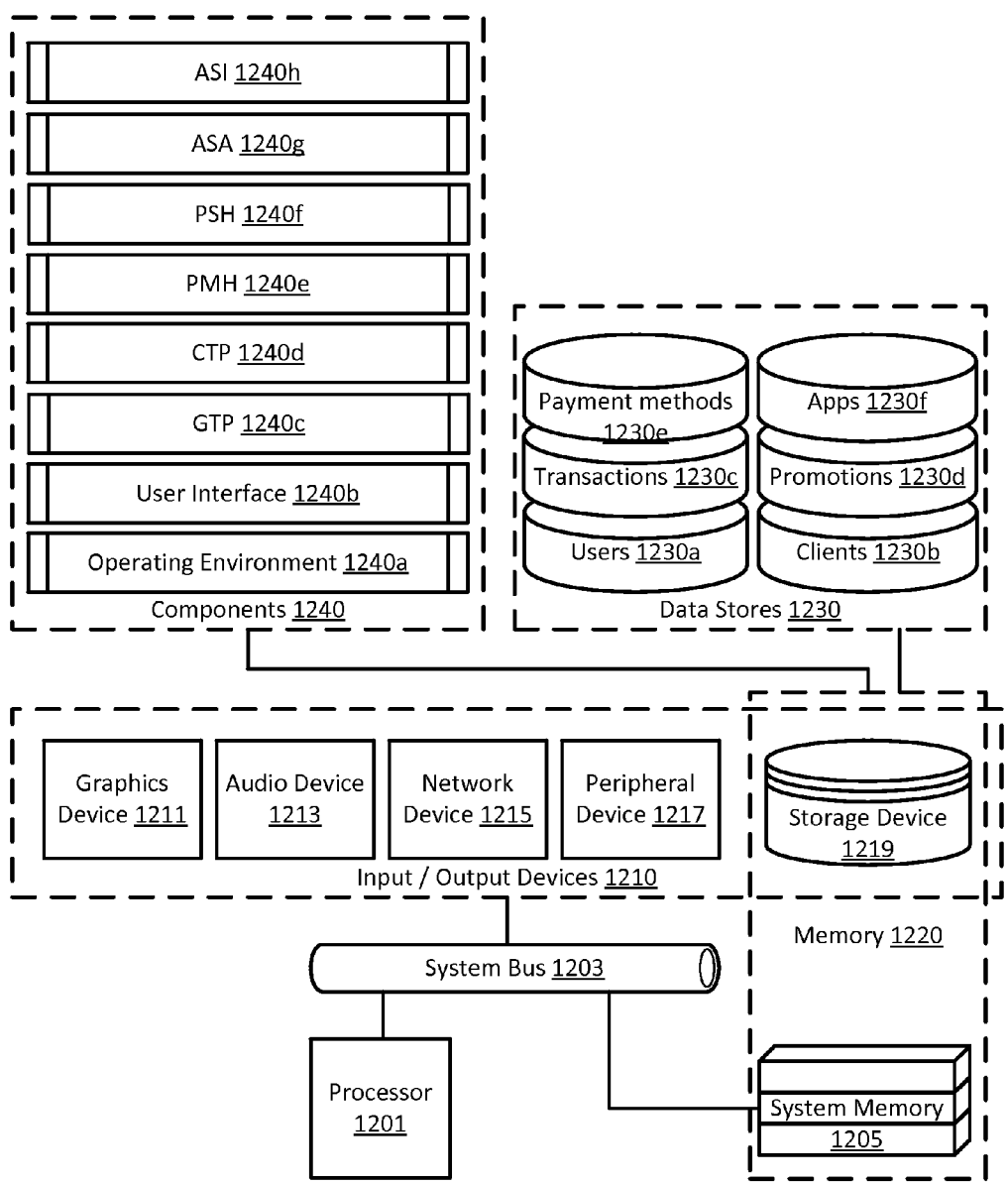
FIG. 12 shows a block diagram illustrating an exemplary PPCEP coordinator in one embodiment of the PPCEP.

FIG. 12 shows a block diagram illustrating an exemplary PPCEP coordinator in one embodiment of the PPCEP. The PPCEP coordinator facilitates the operation of the PPCEP via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the PPCEP coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the PPCEP coordinator may comprise a standalone computer system, a distributed computer system, a node in a computer network (i.e., a network of computer systems organized in a topology), a network of PPCEP coordinators, and/or the like. It is to be understood that the PPCEP coordinator and/or the various PPCEP coordinator elements (e.g., processor, system bus, memory, input/output devices) may be organized in any number of ways (i.e., using any number and configuration of computer systems, computer networks, nodes, PPCEP coordinator elements, and/or the like) to facilitate PPCEP operation. Furthermore, it is to be understood that the various PPCEP coordinator computer systems, PPCEP coordinator computer networks, PPCEP coordinator nodes, PPCEP coordinator elements, and/or the like may communicate among each other in any number of ways to facilitate PPCEP operation. As used in this disclosure, the term "user" refers generally to people and/or computer systems that interact with the PPCEP; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The PPCEP coordinator includes a processor 1201 that executes program instructions (e.g., PPCEP program instructions). In various embodiments, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory 1205 via a system bus 1203. The system bus may interconnect these and/or other elements of the PPCEP coordinator via electrical, electronic, optical, wireless, and/or the like communication links (e.g., the system bus may be integrated into a motherboard that interconnects PPCEP coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's HyperTransport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions (e.g., PPCEP program instructions) executed by the processor. The system memory may facilitate accessing, storing, retrieving, modifying, deleting, and/or the like data (e.g., PPCEP data) by the processor.

In various embodiments, input/output devices 1210 may be connected to the processor and/or to the system memory, and/or to one another via the system bus.

In some embodiments, the input/output devices may include one or more graphics devices 1211. The processor may make use of the one or more graphic devices in accordance with program instructions (e.g., PPCEP program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., PPCEP data). A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be an ATI All-in-Wonder HD, a Hauppauge ImpactVBR 01381, a Hauppauge WinTV-HVR-2250, a Hauppauge Colossus 01414, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 1213. The processor may make use of the one or more audio devices in accordance with program instructions (e.g., PPCEP program instructions) executed by the processor. In one implementation, an audio device may be a sound card that may obtain (e.g., via a connected microphone), process, output (e.g., via connected speakers), and/or the like audio data (e.g., PPCEP data). A sound card may be connected to the system bus via an interface such as PCI, PCI Express, USB, PC Card, ExpressCard, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster X-Fi Titanium HD, a Creative Sound Blaster X-Fi Go! Pro, a Creative Sound Blaster Recon 3D, a Turtle Beach Riviera, a Turtle Beach Amigo II, and/or the like. An audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 1215. The processor may make use of the one or more network devices in accordance with program instructions (e.g., PPCEP program instructions) executed by the processor. In one implementation, a network device may be a network card that may obtain (e.g., via a Category 5 Ethernet cable), process, output (e.g., via a wireless antenna), and/or the like network data (e.g., PPCEP data). A network card may be connected to the system bus via an interface such as PCI, PCI Express, USB, FireWire, PC Card, ExpressCard, and/or the like. A network card may be a wired network card (e.g., 10/100/

1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX-MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 1217. The processor may make use of the one or more peripheral devices in accordance with program instructions (e.g., PPCEP program instructions) executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a chemical sensor, a magnetometer, a radar, a sonar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the PPCEP coordinator with a variety of input, output and processing capabilities.

In some embodiments, the input/output devices may include one or more storage devices 1219. The processor may access, read from, write to, store in, erase, modify, and/or the like a storage device in accordance with program instructions (e.g., PPCEP program instructions) executed by the processor. A storage device may facilitate accessing, storing, retrieving, modifying, deleting, and/or the like data (e.g., PPCEP data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool. In yet another example, an SSD cache may be used with a HDD to improve speed.

Together and/or separately the system memory 1205 and the one or more storage devices 1219 may be referred to as memory 1220 (i.e., physical memory).

PPCEP memory 1220 contains processor-operable (e.g., accessible) PPCEP data stores 1230. Data stores 1230 comprise data that may be used (e.g., by the PPCEP) via the PPCEP coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, PPCEP coordinator elements, and/or the like) to facilitate PPCEP operation. For example, PPCEP data stores may comprise data stores 1230a-f implemented as one or more databases. A users data store 1230a may be a collection of database tables that include fields such as UserID, UserName, MerchantData, CustomerData, and/or the like. A clients data store 1230b may be a collection of database tables that include fields such as ClientID, ClientName, CED_DeviceType, CED_ScreenResolution, CED_Location, and/or the like. A transactions data store 1230c may be a collection of database tables that include fields such as TransactionID, TransactionMerchantID, TransactionType, TransactionAmount, TransactionItems, TransactionDate, TransactionTime, TransactionPaymentMethods, and/or the like. A promotions data store 1230d may be a collection of database tables that include fields such as PromotionID, PromotionFileName, PromotionType, PromotionDetails, PromotionAmount, and/or the like. A payment methods data store 1230e may be a collection of database tables that include fields such as PaymentMethodID, PaymentMethodName, PaymentMethodFees, PaymentMethodPreferenceOrder, PaymentMethodHasRewardPoints, and/or the like. An apps data store 1230f may be a collection of database tables that include fields such as AppID, AppName, AppParameters, AppScheduledUpdateTime, AppDownloadSettings, and/or the like. The PPCEP coordinator may use data stores 1230 to keep track of inputs, parameters, settings, variables, records, outputs, and/or the like.

PPCEP memory 1220 contains processor-operable (e.g., executable) PPCEP components 1240. Components 1240 comprise program components (including program instructions and any associated data stores) that are executed (e.g., by the PPCEP) via the PPCEP coordinator (i.e., via the processor) to transform PPCEP inputs into PPCEP outputs. It is to be understood that the various components and their subcomponents, capabilities, applications, and/or the like may be organized in any number of ways (i.e., using any number and configuration of components, subcomponents, capabilities, applications, PPCEP coordinator elements, and/or the like) to facilitate PPCEP operation. Furthermore, it is to be understood that the various components and their subcomponents, capabilities, applications, and/or the like may communicate among each other in any number of ways to facilitate PPCEP operation. For example, the various components and their subcomponents, capabilities, applications, and/or the like may be combined, integrated, consolidated, split up, distributed, and/or the like in any number of ways to facilitate PPCEP operation. In another example, a single or multiple instances of the various components and their subcomponents, capabilities, applications, and/or the like may be instantiated on each of a single PPCEP coordinator node, across multiple PPCEP coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 1240 may include an operating environment component 1240a. The operating environment component may facilitate operation of the PPCEP via various subcomponents.

In some implementations, the operating environment component may include an operating system subcomponent. The operating system subcomponent may provide an abstraction layer that facilitates the use of, communication among, common services for, interaction with, security of, and/or the like of various PPCEP coordinator elements, components, data stores, and/or the like.

In some embodiments, the operating system subcomponent may facilitate execution of program instructions (e.g., PPCEP program instructions) by the processor by providing process management capabilities. For example, the operating system subcomponent may facilitate the use of multiple processors, the execution of multiple processes, multitasking, and/or the like.

In some embodiments, the operating system subcomponent may facilitate the use of memory by the PPCEP. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the PPCEP coordinator as a node in a computer network by providing support for one or more communications protocols. For example, the operating system subcomponent may include support for the internet protocol suite (i.e., Transmission Control Protocol/Internet Protocol (TCP/IP)) of network protocols such as TCP, IP, User Datagram Protocol (UDP), Mobile IP, and/or the like. In another example, the operating system subcomponent may include support for security protocols (e.g., Wired Equivalent Privacy (WEP), Wi-Fi Protected Access (WPA), WPA2) for wireless computer networks. In yet another example, the operating system subcomponent may include support for virtual private networks (VPNs).

In some embodiments, the operating system subcomponent may facilitate security of the PPCEP coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the PPCEP by providing user interface elements that may be used by the PPCEP to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, GTK+, Qt, Yahoo! User Interface Library (YUI), and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Mac OS X Aqua, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 7, Apple Mac OS X, Apple iOS, Android, Symbian, Windows Phone 7, Blackberry QNX, and/or the like.

In some implementations, the operating environment component may include a database subcomponent. The database subcomponent may facilitate PPCEP capabilities such as storage, analysis, retrieval, access, modification, deletion, aggregation, generation, and/or the like of data (e.g., the use of data stores 1230). The database subcomponent may make use of database languages (e.g., Structured Query Language (SQL), XQuery), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, and/or the like.

In some implementations, the operating environment component may include an information handling subcomponent. The information handling subcomponent may provide the PPCEP with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some embodiments, the information handling subcomponent may facilitate the serving of information to users, PPCEP components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 1230) via the database subcomponent.

In some embodiments, the information handling subcomponent may facilitate presentation of information obtained from users, PPCEP components, nodes in a computer network, web servers, and/or the like. For example, the information handling subcomponent may comprise a web browser such as Microsoft Internet Explorer, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate PPCEP message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, AOL's Open System for Communication in Realtime (OSCAR), Messaging Application Programming Interface (MAPI), Facebook API, and/or the like to facilitate PPCEP message communications. The messaging subcomponent may facilitate message communications such as email, instant messaging, Voice over IP (VoIP), video conferencing, Short Message Service (SMS), web chat, and/or the like. For example, the messaging subcomponent may comprise Microsoft Exchange Server, Microsoft Outlook, Sendmail, IBM Lotus Domino, Gmail, AOL Instant Messenger (AIM), Yahoo Messenger, ICQ, Trillian, Skype, Google Talk, Apple FaceTime, Apple iChat, Facebook Chat, and/or the like.

In some implementations, the operating environment component may include a security subcomponent that facilitates PPCEP security. In some embodiments, the security subcomponent may restrict access to the PPCEP, to one or more services provided by the PPCEP, to data associated with the PPCEP (e.g., stored in data stores 1230), to communication messages associated with the PPCEP, and/or the like to authorized users. Access may be granted via a login screen, via an API that obtains authentication information, via an authentication token, and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, and/or the like may be used to control access. For example, the security subcomponent may facilitate digital rights management (DRM), network intrusion detection, firewall capabilities, and/or the like.

In some embodiments, the security subcomponent may use cryptographic techniques to secure information (e.g., by storing encrypted data), verify message authentication (e.g., via a digital signature), provide integrity checking (e.g., a checksum), and/or the like by facilitating encryption and/or decryption of data. Furthermore, steganographic techniques may be used instead of or in combination with cryptographic techniques. Cryptographic techniques used by the PPCEP may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Digital Signature Algorithm (DSA)), cryptographic hash functions (e.g., using algorithms such as Message-Digest 5 (MD5), Secure Hash Algorithm 2 (SHA-2)), and/or the like. For example, the security subcomponent may comprise a cryptographic system such as Pretty Good Privacy (PGP).

In some implementations, the operating environment component may include a virtualization subcomponent that facilitates PPCEP virtualization capabilities. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via memory virtualization, storage virtualization, data virtualization, network virtualization, and/or the like. For example, the virtualization subcomponent may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solaris 10, Oracle Solaris 11), Informatica Data Services, Wine, and/or the like.

In some embodiments, components 1240 may include a user interface component 1240*b*. The user interface component may facilitate user interaction with the PPCEP by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In some embodiments, components 1240 may include any of the components GTP 1240*c*, CTP 1240*d*, PMH 1240*e*, PSH 1240*f*, ASA 1240*g*, ASI 1240*h* described in more detail in preceding figures.

THE EMBODIMENTS OF THE PPCEP

The entirety of this disclosure (including the written description, figures, claims, abstract, appendices, and/or the like) for PAYMENT PROCESSING AND CUSTOMER ENGAGEMENT PLATFORM METHODS, APPARATUSES AND MEDIA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the PPCEP coordinator, PPCEP coordinator elements, PPCEP data stores, PPCEP components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the PPCEP coordinator, PPCEP coordinator elements, PPCEP data stores, PPCEP components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/or the like. It is to be understood that while some embodiments of the PPCEP discussed in this disclosure have been directed to facilitating customer based transaction processing by merchants utilizing POS systems, the innovations described in this disclosure may be readily applied to a wide variety of other fields and/or applications.

The following is claimed:

1. A payment collection method, comprising:
   receiving, at a gateway and from a point of sale system, transaction data gathered by the point of sale system and in response to a transaction;
   generating, at the gateway, a payment token, wherein the payment token is based at least in part on the transaction data and is in a format that simulates a payment card number;
   transmitting the payment token to the point of sale system from the gateway;
   receiving, from the point of sale system and at a customer engagement device, a transaction authorization request that comprises the payment token;
   extracting, by the customer engagement device, the payment token from the transaction authorization request;
   transmitting to the gateway, from the customer engagement device, the payment token and an identifier of the customer engagement device;
   prompting, on the customer engagement device, a customer to provide payment information for the transaction;
   collecting, on the customer engagement device, payment information from the customer;
   transmitting to the gateway, from the customer engagement device, the payment information and the identifier of the customer engagement device;
   receiving, from the gateway and at the customer engagement device, a transaction authorization response based on the payment information; and
   transmitting to the point of sale system, from the customer engagement device, the transaction authorization response.

2. The method of claim 1, further comprising:
   retrieving, from the gateway, promotional details related to the transaction; and
   providing the promotional details to the customer.

3. The method of claim 1, wherein the collecting payment information further comprises:
   determining available payment methods for the transaction;
   determining a preference order for the available payment methods; and
   displaying the available payment methods in accordance with the preference order.

4. The method of claim 3, wherein the available payment methods are determined based on characteristics of the transaction, and wherein the characteristics of the transaction include at least one of item type, item price, item quantity and a total amount due.

5. The method of claim 3, wherein the preference order is determined based on transaction costs of the available payment methods.

6. The method of claim 3, wherein the preference order is determined by a processor based on a branding of the available payment methods.

7. The method of claim 3, wherein the preference order is determined based on tracking or reporting capabilities of the available payment methods.

8. The method of claim 3, wherein the available payment methods are displayed in an order from most preferable to least preferable.

9. The method of claim 3, further comprising:
   obtaining a payment method selection from the customer;
   determining that an alternate payment method is available;
   providing a payment steering message to the customer;
   obtaining an updated payment method selection from the customer; and
   obtaining payment details from the updated payment method selection.

10. The method of claim 9, wherein the payment steering message includes an incentive for using the alternate payment method.

11. The method of claim 9, further comprising:
    determining that reward points are available from the customer's payment method; and
    facilitating the use of the reward points to pay for at least a portion of the transaction.

* * * * *